(12) United States Patent
Matsubara et al.

(10) Patent No.: US 11,456,650 B2
(45) Date of Patent: Sep. 27, 2022

(54) ROTOR MANUFACTURING METHOD

(71) Applicant: AISIN CORPORATION, Kariya (JP)

(72) Inventors: Tetsuya Matsubara, Anjo (JP); Motoki Kori, Anjo (JP)

(73) Assignee: AISIN CORPORATION, Kariya (JP)

( * ) Notice: Subject to any disclaimer, the term of this patent is extended or adjusted under 35 U.S.C. 154(b) by 666 days.

(21) Appl. No.: 16/480,721

(22) PCT Filed: Mar. 27, 2018

(86) PCT No.: PCT/JP2018/012532
§ 371 (c)(1),
(2) Date: Jul. 25, 2019

(87) PCT Pub. No.: WO2018/181374
PCT Pub. Date: Oct. 4, 2018

(65) Prior Publication Data
US 2020/0177063 A1  Jun. 4, 2020

(30) Foreign Application Priority Data

Mar. 30, 2017  (JP) .............................. JP2017-068564

(51) Int. Cl.
*H02K 15/03* (2006.01)
*H02K 15/12* (2006.01)
*H02K 1/27* (2022.01)

(52) U.S. Cl.
CPC ............... *H02K 15/03* (2013.01); *H02K 1/27* (2013.01); *H02K 15/12* (2013.01)

(58) Field of Classification Search
CPC ........... H02K 15/03; H02K 1/27; H02K 15/12
See application file for complete search history.

(56) References Cited

U.S. PATENT DOCUMENTS

2018/0041080 A1    2/2018  Nakano et al.
2019/0326042 A1*  10/2019  Takagi ................. C09J 5/08

FOREIGN PATENT DOCUMENTS

| JP | H07-194073 A | 7/1995 |
| JP | H09-4975 A | 1/1997 |
| JP | H11-252838 A | 9/1999 |
| JP | 2005-304247 A | 10/2005 |
| JP | 2006-353076 A | 12/2006 |
| JP | 2007-151362 A | 6/2007 |
| JP | 2015-083920 A | 4/2015 |
| WO | 2016/185829 A1 | 11/2016 |

OTHER PUBLICATIONS

Jun. 26, 2018 International Search Report issued in International Patent Application No. PCT/JP2018/012532.

* cited by examiner

*Primary Examiner* — Thomas Truong
(74) *Attorney, Agent, or Firm* — Oliff PLC

(57) ABSTRACT

A method of manufacturing a rotor that includes a rotor core and a permanent magnet fixed to the rotor core using an adhesive, the method includes applying the adhesive, which contains a volatile agent, to an adhesive placement position of the permanent magnet; drying the adhesive by volatilizing the volatile agent by a magnet heater directly heating the permanent magnet such that a temperature of the permanent magnet becomes higher than a temperature of the adhesive after applying the adhesive; placing the permanent magnet on the rotor core after drying the adhesive; and fixing the permanent magnet to the rotor core by curing the adhesive after placing the permanent magnet.

20 Claims, 9 Drawing Sheets

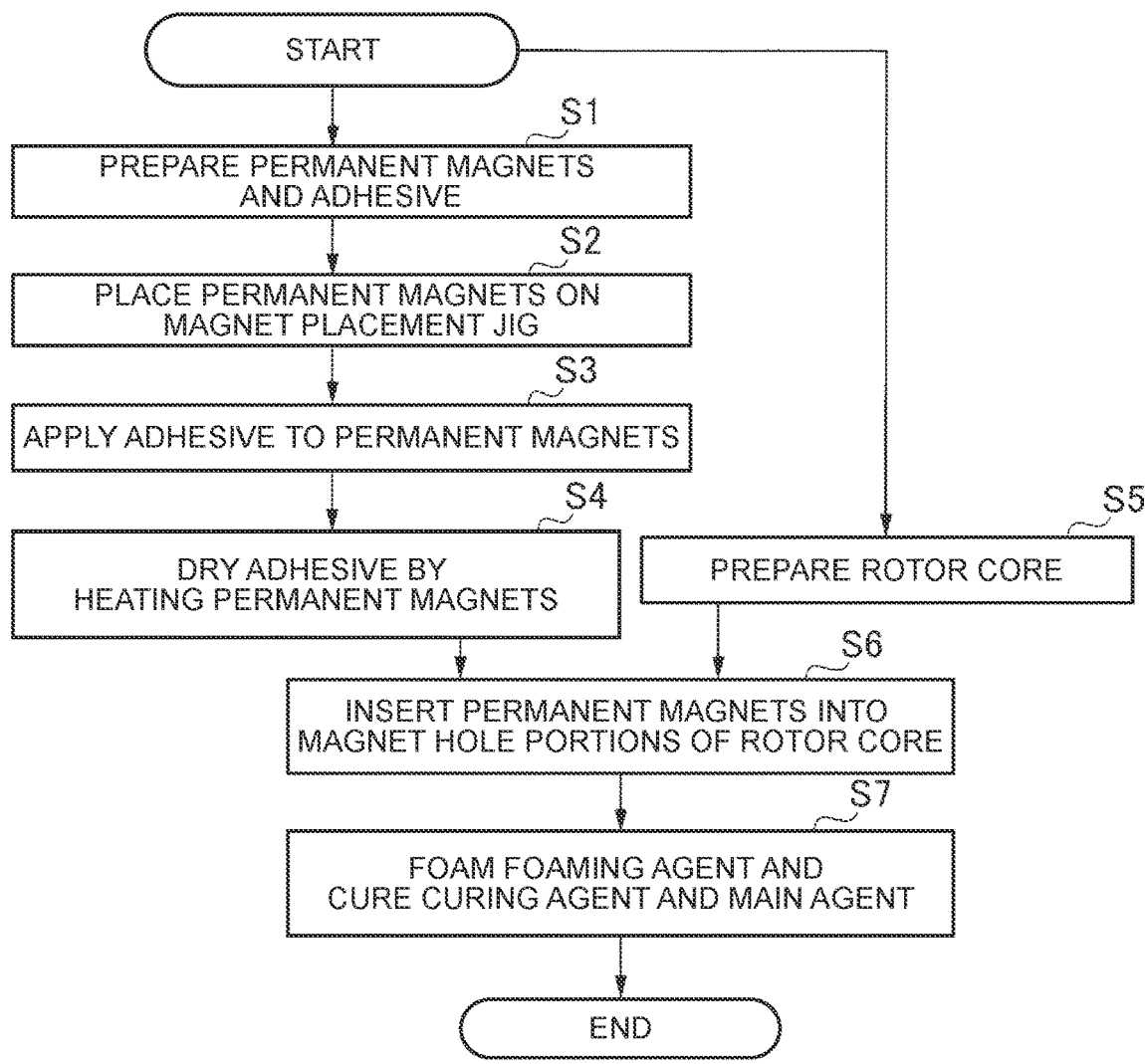
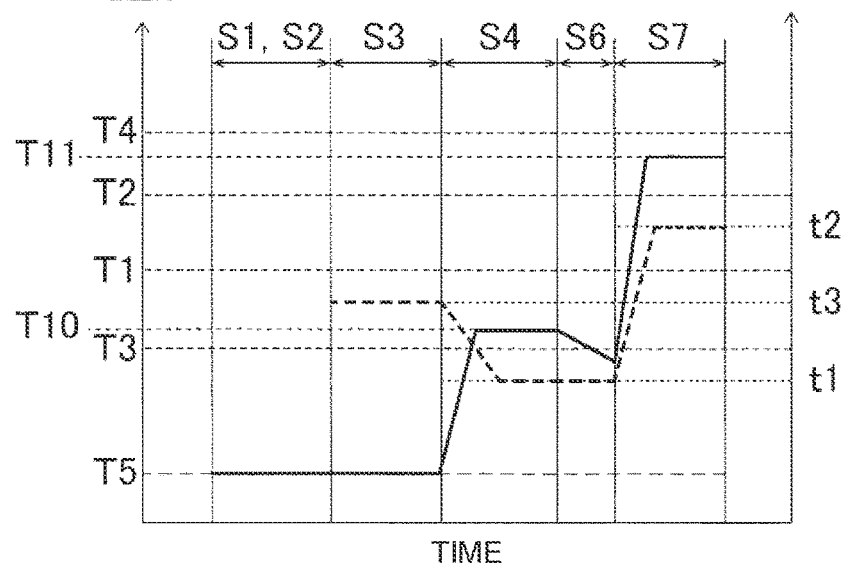

ROTOR MANUFACTURING METHOD

BACKGROUND

The present disclosure relates to a rotor manufacturing method.

There has hitherto been known a rotor manufacturing method in which permanent magnets are fixed to a rotor core using an adhesive. Such a method is disclosed in Japanese Patent Application Publication No. 2005-304247 (JP 2005-304247 A), for example.

Japanese Patent Application Publication No. 2005-304247 (JP 2005-304247 A) discloses a method of manufacturing a permanent magnet motor in which a permanent magnet is fixed in a slot of a rotor core by thermally curing an adhesive. In the manufacturing method, a predetermined amount of a liquid adhesive is injected into the slot of the rotor core. After that, the permanent magnet is inserted into the slot into which the adhesive has been injected. After that, the slot is closed by an end plate. After that, the rotor is inverted upside down and heated so that the adhesive is thermally cured, thereby the permanent magnet and the rotor core are fixed to each other.

With the permanent magnet motor manufacturing method described in Japanese Patent Application Publication No. 2005-304247 (JP 2005-304247 A), however, the permanent magnet is inserted into the slot into which the liquid adhesive has been injected, and thus it is conceivable that the liquid adhesive flows inside the slot to reach a position at which the adhesive should not be placed, or to be cured in a state different from the design film thickness. For example, it is conceivable that the adhesive reaches a position at which the rotor core and the permanent magnet should abut against (be proximate to) each other not via the adhesive, or that a sufficient thickness of the adhesive is not secured at a portion at which the thickness of the adhesive is necessary. That is, with the permanent magnet motor manufacturing method described in Japanese Patent Application Publication No. 2005-304247 (JP 2005-304247 A), it is disadvantageously difficult to control the position of placement of the adhesive (adhesive placement position).

Thus, in order to facilitate the control of the position of placement of the adhesive, a rotor manufacturing method is conceivable in which an adhesive containing a volatile agent is applied to a permanent magnet and thereafter the adhesive is dried by volatilizing the volatile agent, thereby positioning and fixing the adhesive at an adhesive placement position by improving the viscosity of the adhesive. For example, it is conceivable to place a permanent magnet, to which an adhesive has been applied, in a heating furnace and dry the adhesive by raising the atmospheric temperature in the heating furnace.

SUMMARY

In the rotor manufacturing method according to the related art described above, however, as the adhesive is heated by the raised atmospheric temperature in the heating furnace, the permanent magnet which is placed in the heating furnace is also heated. The permanent magnet has a large heat capacity compared to the adhesive, and the temperature of the permanent magnet is raised slowly compared to the adhesive, Hence, while the temperature of a surface portion of the adhesive is raised by heat from the atmosphere in the heating furnace at a relatively high temperature, a boundary portion of the adhesive with the permanent magnet is deprived of heat by the permanent magnet, which extends the drying time for the entire adhesive with the temperature rise of the entire adhesive affected by the temperature rise of the permanent magnet. Thus, in order to shorten the drying time, it is conceivable to further raise the atmospheric temperature in the heating furnace. If the atmospheric temperature in the heating furnace is raised excessively, however, it is conceivable that the surface portion of the adhesive, which has been dried, may be softened with the temperature of the surface portion of the adhesive raised excessively. Therefore, the atmospheric temperature in the heating furnace cannot be raised more than necessary, and there is a limit to shortening the drying time.

An exemplary aspect of the disclosure provides a rotor manufacturing method that enables an adhesive to be dried immediately in the case where permanent magnets are fixed to a rotor core using the dried adhesive.

An aspect of the present disclosure provides a method of manufacturing a rotor that includes a rotor core and a permanent magnet fixed to the rotor core using an adhesive. The method includes: applying the adhesive, which contains a volatile agent, to an adhesive placement position of the permanent magnet; drying the adhesive by volatilizing the volatile agent by a magnet heater directly heating the permanent magnet applying the adhesive; placing the permanent magnet on the rotor core after drying the adhesive; and fixing the permanent magnet to the rotor core by curing the adhesive after placing the permanent magnet. Herein, the phrase "apply an adhesive" is used to mean a wide concept including not only applying the adhesive using a nozzle or the like but also applying the adhesive through stamping (transfer) using a stamp or the like. In addition, the term "permanent magnet" is used to mean a wide concept including not only a magnet after being magnetized but also a magnet before being magnetized. In addition, the phrase "by a magnet heater directly heating the permanent magnet" refers to a concept that includes not only a case where the permanent magnet is directly heated with the magnet heater contacting the permanent magnet, but also a case where the permanent magnet is directly heated by induction heating (IH), a high-energy beam (laser), or a local hot air applied to the permanent magnet with the magnet heater located away from the permanent magnet.

In the rotor manufacturing method according to the aspect of the disclosure, the adhesive is dried by volatilizing the volatile agent by the magnet heater directly heating the permanent magnet. Consequently, the boundary of the adhesive with the permanent magnet is directly heated by the permanent magnet, which prevents an increase in the drying time for the boundary of the adhesive with the permanent magnet, unlike a case where the temperature of the permanent magnet is lower than that of the adhesive and heat is absorbed by the permanent magnet. As a result, an increase in the drying time for the boundary of the adhesive, the drying time for which tends to be relatively long, can be prevented, and accordingly the drying time for the entire adhesive can be shortened easily. Thus, the adhesive can be dried immediately in the case where the permanent magnet is fixed to the rotor core using the dried adhesive.

According to the present disclosure, as described above, the adhesive can be dried immediately in the case where the permanent magnet is fixed to the rotor core using the dried adhesive.

BRIEF DESCRIPTION OF THE DRAWINGS

FIG. 13 is a flowchart illustrating a rotor manufacturing process according to the embodiment of the present disclosure, FIG. 14 illustrates the thickness of the adhesive and the temperature of the adhesive during the rotor manufacturing process according to the embodiment of the present disclosure.

DETAILED DESCRIPTION OF EMBODIMENTS

An embodiment of the present disclosure will be described below with reference to the drawings.

[Structure of Rotor According to Present Embodiment]

The structure of a rotor 100 according to the present embodiment will be described with reference to FIGS. 1 to 8. The rotor 100 constitutes a part of a rotary electric machine 101. The rotary electric machine 101 is constituted as a motor or a generator, for example.

Figure 1:
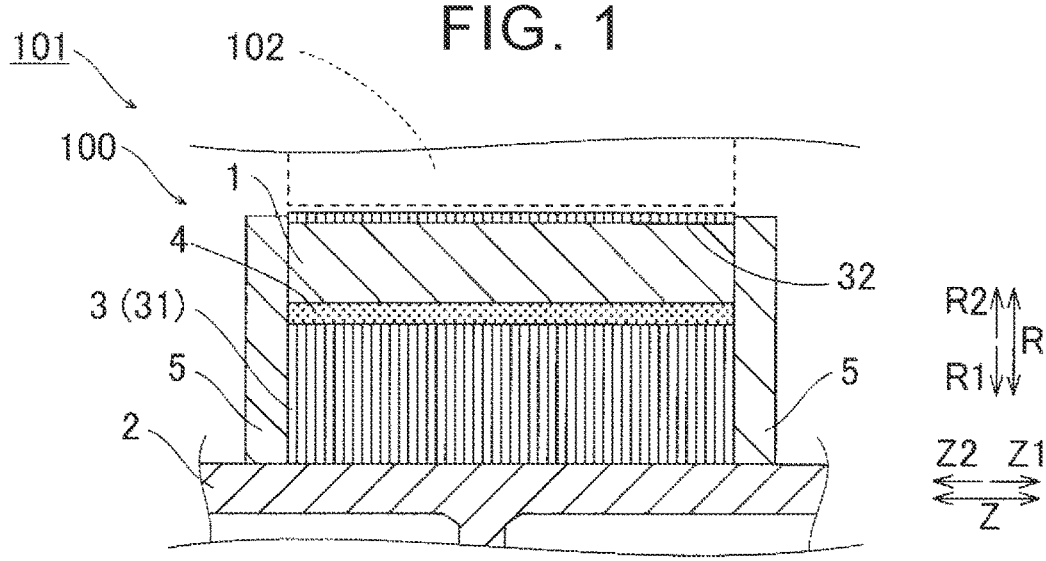
FIG. 1 is a sectional view of a rotary electric machine (rotor) according to an embodiment of the present disclosure.

The terms "rotational axis direction" and "axial direction" as used herein mean the direction of the rotational axis of the rotor 100 (a direction along an axis C1 (see FIG. 2); a direction that is parallel to the Z axis in FIG. 1). In addition, the term "circumferential direction" means the circumferential direction of the rotor 100 (the direction of an arrow A1 or the direction of an arrow A2 in FIG. 2). The term "radial direction" means the radial direction of the rotor 100 (the direction of an arrow R1 or the direction of an arrow R2 in FIG. 1). In addition, the term "radially inner side" means the radially inner side of the rotor 100 (side in the direction of the arrow R1), and the term "radially outer side" means the radially outer side of the rotor 100 (side in the direction of the arrow R2).

(Overall Structure of Rotor)

As illustrated in FIG. 1, the rotor 100 constitutes a part of an interior permanent magnet (IPM) motor (a part of the rotary electric machine 101) in which a plurality of permanent magnets 1 are embedded inside the rotor 100, for example.

The rotor 100 is disposed on the radially inner side of a stator 102 so as to face the stator 102 in the radial direction. That is, the rotary electric machine 101 is constituted as a rotary electric machine of an inner rotor type. The rotary electric machine 101 is configured such that the stator 102 is provided with a coil (not illustrated) and the rotor 100 makes rotational motion through interaction between a magnetic field (magnetic flux) generated by the coil and a magnetic field (magnetic flux) generated by the rotor 100 which faces the stator 102. As illustrated in FIG. 1, the rotor 100 includes the permanent magnets 1, a hub member 2, a rotor core 3, an adhesive 4, and end plates 5. The rotor 100 is fixed to the hub member 2 which is connected to a shaft, and configured to transfer rotational motion to (or receive rotational motion transferred from) the outside of the rotary electric machine 101 via the hub member 2 and the shaft. The stator 102 is fixed to a case (not illustrated) of the rotary electric machine 101.

The permanent magnets 1 are formed from neodymium magnets, for example. The neodymium magnets have a positive coefficient of thermal expansion in the magnetization direction (the direction of the arrow R1 and the direction of the arrow R2), and have a negative coefficient of thermal expansion in a direction that is perpendicular to the magnetization direction (the width direction of the permanent magnets 1 and a direction along the Z axis). The term "width direction of the permanent magnets 1" refers to a direction that is perpendicular to the Z axis and that is perpendicular to the magnetization direction.

Figure 3:
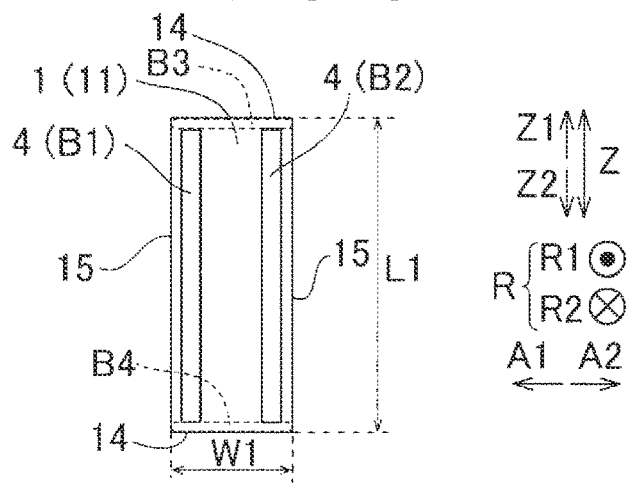
FIG. 3 is a side view illustrating the configuration of a permanent magnet and an adhesive according to the embodiment of the present disclosure.
Figure 4:
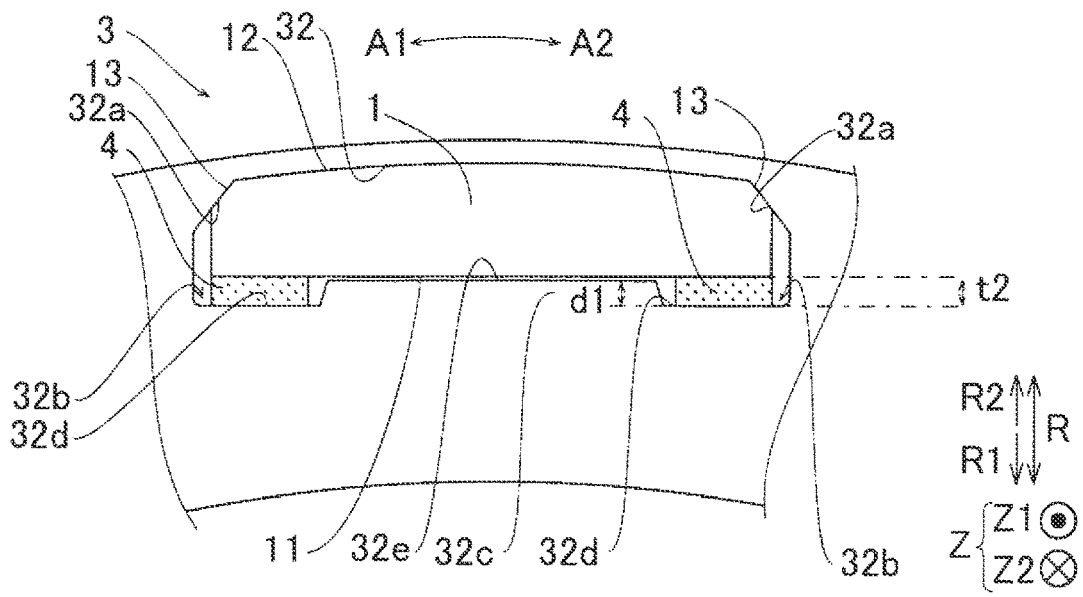
FIG. 4 is a partial plan view illustrating a state in which the permanent magnet and a rotor core are bonded to each other by the adhesive according to the embodiment of the present disclosure.

As illustrated in FIG. 3, the permanent magnet 1 is formed so as to have a generally rectangular shape that has a length L1 in the axial direction and a width W1 that is smaller than the length L1 as seen from the radially inner side. As illustrated in FIG. 4, the permanent magnet 1 has a generally rectangular shape in which two corner portions on the radially outer side are chamfered as seen from the side in the direction of an arrow Z1. The permanent magnet 1 is configured such that a surface 11 on the radially inner side is a flat surface and a surface 12 on the radially outer side is an arcuate surface.

The two chamfered corner portions of the permanent magnet 1 are each provided with a surface 13 that serves as an abutment surface that abuts against a magnet hole portion 32 to be discussed later. The two surfaces 13 of the permanent magnet 1 are disposed so as to abut against (make surface contact with) wall surfaces 32a of the magnet hole portion 32. That is, the permanent magnet 1 is fixed as positioned by the pair of wall surfaces 32a which form a tapered shape as seen from the side in the direction of the arrow Z1.

Figure 2:
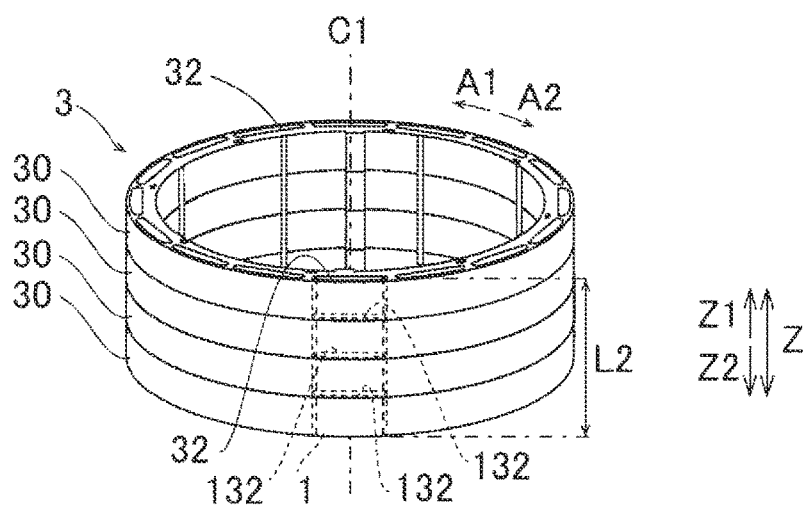
FIG. 2 is a perspective view of the rotor according to the embodiment of the present disclosure.

As illustrated in FIG. 2, the rotor core 3 includes a plurality of (e.g. four) core blocks 30 that have a circular ring shape. The plurality of core blocks 30 are stacked on each other in the axial direction while sharing the center axis C1. The core blocks 30 are each formed by stacking a plurality of electromagnetic steel plates 31 (see FIG. 1; e.g. silicon steel plates) having a circular ring shape on each other in the axial direction.

The core blocks 30 are each provided with a plurality of (e.g. 16) hole portions 132 constituted as through holes that extend along the axial direction. In addition, the plurality of core blocks 30 are stacked on each other in the axial direction such that the hole portions 132 overlap (or completely coincide with) each other in position as seen from the side in the direction of the arrow Z1. Consequently, the hole portions 132 of the plurality of core blocks 30 are connected so as to be continuous with each other in the rotor core 3, thereby forming the magnet hole portions 32 into which the permanent magnets 1 are inserted along the axial direction. In addition, the plurality of magnet hole portions 32 are disposed circumferentially at equal angular intervals as seen from the side in the direction of the arrow Z1.

The permanent magnets 1 are disposed in the plurality of magnet hole portions 32. The magnet hole portions 32 and the permanent magnets 1 are fixed (bonded) to each other by the adhesive 4 (see FIG. 4). In addition, a length L2 of the magnet hole portions 32 in the axial direction is equal to or less than the length L1 of the permanent magnets 1 in the axial direction.

As illustrated in FIG. 4, the magnet hole portions 32 are each provided with two groove portions 32b, in each of which the adhesive 4 is placed and which are dented toward the radially inner side of the rotor core 3 and extend along the axial direction. Particularly, the two groove portions 32b are disposed at positions facing, in the radial direction, adhesive placement positions B1 and B2 (see FIG. 3) on the surface 11 of the permanent magnet 1. The two groove portions 32b are provided in the vicinity of both end portions of the magnet hole portion 32 in the circumferential direction. A projecting portion 32c is provided between the two groove portions 32b. The two groove portions 32b each have a bottom portion 32d, and are configured such that a groove depth d1 from a top surface 32e of the projecting portion 32c to the bottom portion 32d is larger than a thickness t1 (see FIG. 7) to be discussed later and equal to or less than a thickness t2.

As illustrated in FIG. 3, the adhesive 4 is placed in contact with a part of the surface 11 on the radially inner side of the permanent magnet 1. For example, the adhesive 4 is placed on only a part of the surface 11 on the radially inner side of the permanent magnet 1. Particularly, the adhesive 4 is placed at only the adhesive placement positions B1 and B2 on the surface 11 of the permanent magnet 1. That is, the adhesive 4 is placed at two locations, namely the adhesive placement position B1 on one side in the lateral direction (on the side in the direction of the arrow A1) and the adhesive placement position B2 on the other side in the lateral direction (on the side in the direction of the arrow A2), on the surface 11 of the permanent magnet 1. The adhesive 4 is formed so as to have a rectangular shape that extends in the longitudinal direction of the surface 11 of the permanent magnet 1 (in the axial direction from the side in the direction of the arrow Z1 to the side in the direction of an arrow Z2). The adhesive 4 is not placed on axial end surfaces 14 (hereinafter "end surfaces 14") or circumferential end surfaces 15 (hereinafter "end surfaces 15") of the permanent magnet 1, or in a portion B3 (on the side in the direction of the arrow Z1) or a portion B4 (on the side in the direction of the arrow Z2) of the surface 11 of the permanent magnet 1 in the vicinity of the axial end surfaces 14.

As illustrated in FIG. 5, when the permanent magnet 1 and the rotor core 3 are fixed (bonded) to each other by the adhesive 4, the adhesive 4 contains a foaming agent 41 in a foamed state, and a main agent 42 and a curing agent 43 in a cured state. The foaming agent 41 is an expansive agent to be foamed (expanded) when heated to a temperature that is equal to or higher than an expansion temperature T1. In addition, the main agent 42 and the curing agent 43 are thermosetting resins that react with each other to be cured when heated to a temperature that is equal to or higher than a curing temperature T2 which is higher than the expansion temperature T1. The foaming agent 41 is an example of the "expansive agent." The main agent 42 and the curing agent 43 are an example of the "thermosetting resin."

Figure 5A:
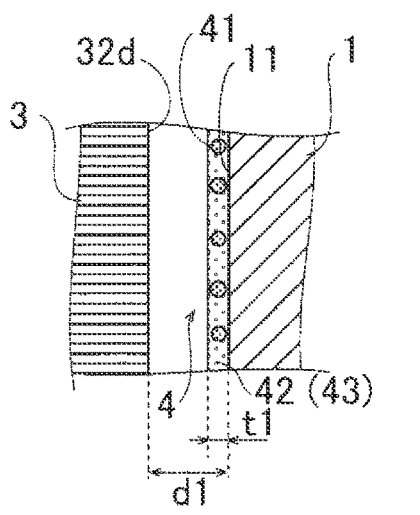
FIG. 5 is a sectional view schematically illustrating a state before (FIG. 5A) and after (FIG. 5B) expansion of the adhesive according to the embodiment of the present disclosure.
Figure 5B:
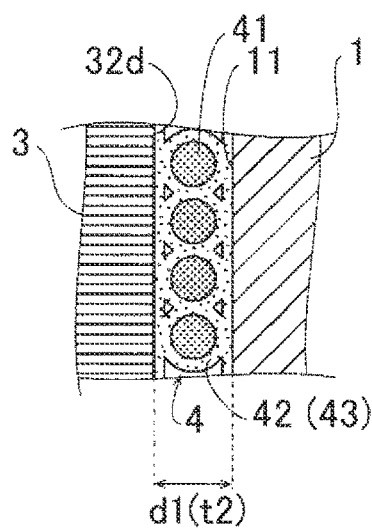

When the foaming agent 41 is foamed and expanded, the thickness of the adhesive 4 is varied from the thickness t1 (FIG. 5A) to the thickness t2 (FIG. 5B). Accordingly, the adhesive 4 is placed to extend from the surface 11 of the permanent magnet 1 to the bottom portion 32d of the groove portion 32b.

Figure 6:
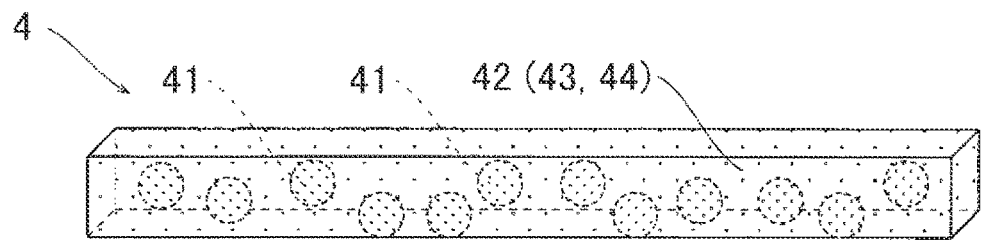
FIG. 6 is a conceptual view illustrating the configuration of the adhesive according to the embodiment of the present disclosure.

As illustrated in FIG. 6, the foaming agent 41 is constituted as capsule bodies, and configured such that the capsule bodies are expanded to increase volume when heated to a temperature that is equal to or higher than the expansion temperature T1. For example, the adhesive 4 contains isopentane as the foaming agent 41. In addition, the expansion temperature T1 can be set as a foam molding temperature at which the capsule bodies are foam-molded, for example.

Figure 7:
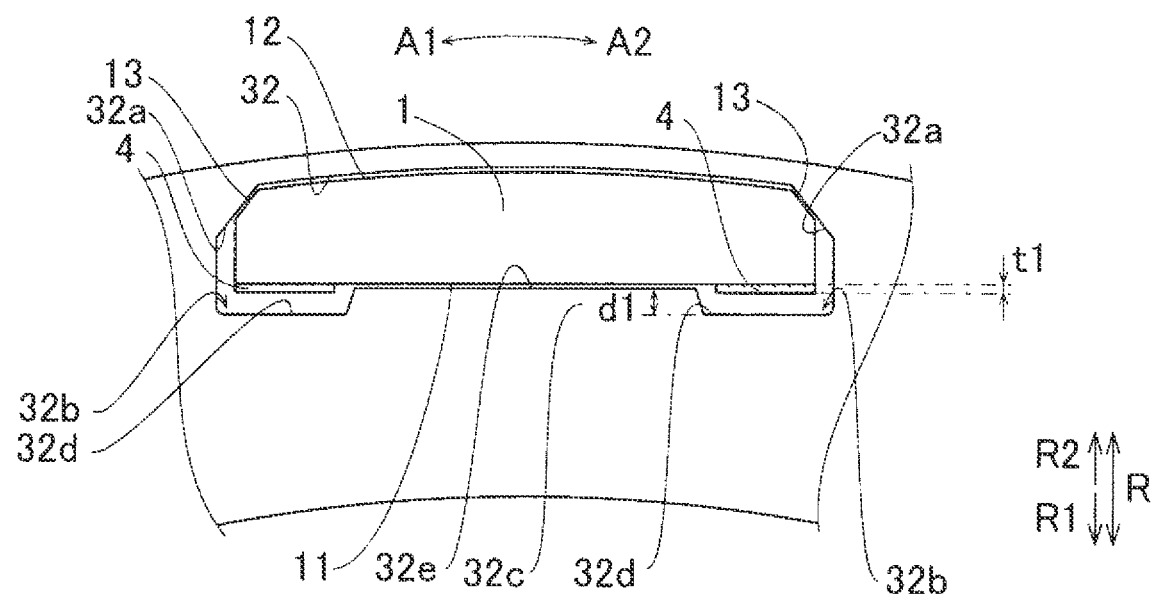
FIG. 7 is a partial plan view illustrating a state in which the permanent magnet is inserted into the rotor core according to the embodiment of the present disclosure.

Before the foaming agent 41 of the adhesive 4 is foamed, as illustrated in FIG. 7, the adhesive 4 and the bottom portions 32d of the groove portions 32b are disposed away from each other, and the surfaces 13 of the permanent magnet 1 and the wall surfaces 32a of the magnet hole portion 32 are disposed away from each other. After the foaming agent 41 of the adhesive 4 is foamed (see FIG. 4), the adhesive 4 is expanded and contacts the bottom portions 32d of the groove portions 32b, the permanent magnet 1 is pressed toward the radially outer side, and the surfaces 13 of the permanent magnet 1 and the wall surfaces 32a of the magnet hole portion 32 are disposed in contact with each other.

The main agent 42 contains an epoxy-based resin (e.g. bisphenol A liquid epoxy and an epoxy resin polymer), for example. The curing agent 43 also contains dicyandiamide, for example. The permanent magnet 1 and the rotor core 3 are bonded and fixed to each other when the main agent 42 and the curing agent 43 of the adhesive 4 are cured. In addition, the curing temperature T2 is higher than a drying temperature T3 to be discussed later, and higher than the expansion temperature T1. In addition, the curing temperature T2 is set in accordance with the combination of the main agent 42 and the curing agent 43, and is lower than a product upper limit temperature T4. The product upper limit temperature T4 can be set as a temperature that does not affect the performance of the rotor 100, for example.

As illustrated in FIG. 8, before the permanent magnet 1 and the rotor core 3 are bonded to each other by the adhesive 4 and before the adhesive 4 is dried, the adhesive 4 contains a dilution solvent 44 that serves as a volatile agent that is volatile, the foaming agent 41 which serves as an expansive agent before being foamed, and the main agent 42 and the curing agent 43 which are not cured yet.

Before the permanent magnet 1 and the rotor core 3 are fixed to each other by the adhesive 4 and after the adhesive i4 is dried (see FIG. 8B), the adhesive 4 contains the foaming agent 41, and the main agent 42 and the curing agent 43 which are not cured yet, That is, after the adhesive 4 is dried, the amount of the dilution solvent 44 in the adhesive 4 has been decreased, or the dilution solvent 44 is generally not contained in the adhesive 4.

The dilution solvent 44 may be a volatile organic solvent including: ketones, such as methyl ethyl ketone; alcohols; and ethers. In the present embodiment, the dilution solvent 44 contains both methyl ethyl ketone and ethyl acetate. In addition, the dilution solvent 44 has a lower viscosity than that of at least one of the foaming agent 41 and the curing agent 43. Consequently, the dilution solvent 44, when contained in the adhesive 4, has a function of lowering the viscosity of the adhesive 4 and enhancing flowability.

In addition, the dilution solvent 44 is volatilized when heated to a temperature (e.g. a temperature T10 in FIG. 14) that is equal to or higher than the drying temperature T3. The drying temperature T3 can be set to the boiling temperature of the dilution solvent 44 or a temperature around such a boiling temperature, for example.

The drying temperature T3 is lower than the expansion temperature T1. In addition, the expansion temperature T1 is lower than the curing temperature T2. Consequently, it is possible to volatilize the dilution solvent 44 without expanding the foaming agent 41 and without curing the main agent 42 or the curing agent 43 by setting the temperature of the adhesive 4 to a temperature that is lower than the expansion temperature T1 and that is equal to or higher than the drying temperature T3.

Figure 8A:
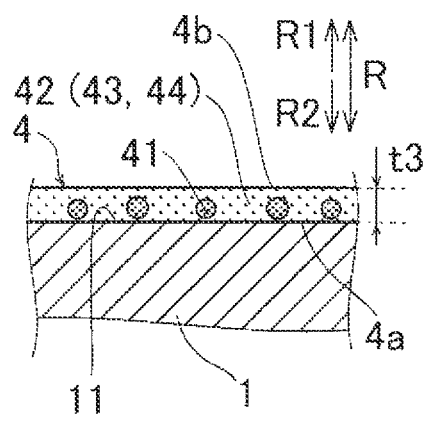
FIG. 8 is a partial sectional view schematically illustrating a state before (FIG. 8A) and after (FIG. 8B) drying of the adhesive according to the embodiment of the present disclosure.
Figure 8B:
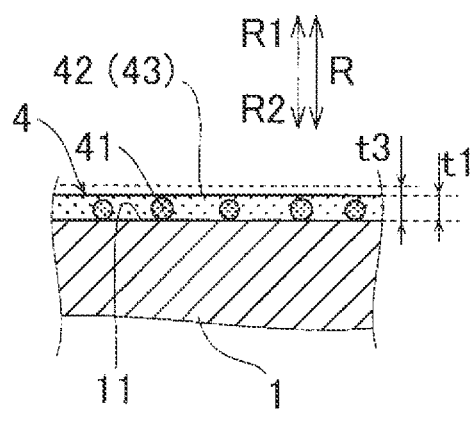

As illustrated in FIG. 8A, the adhesive 4 has a thickness t3 in a direction that is perpendicular to the width direction of the permanent magnet 1 (in the direction of the arrow R1 and the direction of the arrow R2) before being dried. As illustrated in FIG. 813B, the adhesive 4 is decreased in volume to be thinned when the dilution solvent 44 is volatilized. That is, after being dried, the adhesive 4 has the thickness t1 which is smaller than the thickness t3. A portion of the adhesive 4 near the permanent magnet 1 (on the side in the direction of the arrow R2) and including a portion that contacts the surface 11 of the permanent magnet 1 is defined as a boundary portion 4a, and a portion of the adhesive 4 including a portion that contacts the atmosphere on the side in the direction of the arrow R1 is defined as a surface portion 4b.

[Configuration of Magnet Placement Jig and Magnet Heating Portion According to Present Embodiment]

Next, the configuration of a magnet heating portion 50 (magnetic heater) and a magnet placement jig 60 that are used to manufacture the rotor 100 according to the present embodiment will be described with reference to FIGS. 9 to 12.

The term "vertical direction of the permanent magnet" as used herein means a direction (direction of an arrow G) that is perpendicular to the surface 11 or the surface 12 of the permanent magnet 1, and the direction of an arrow G1 and the direction of an arrow G2 indicate the upward direction and the downward direction, respectively.

Figure 9A:
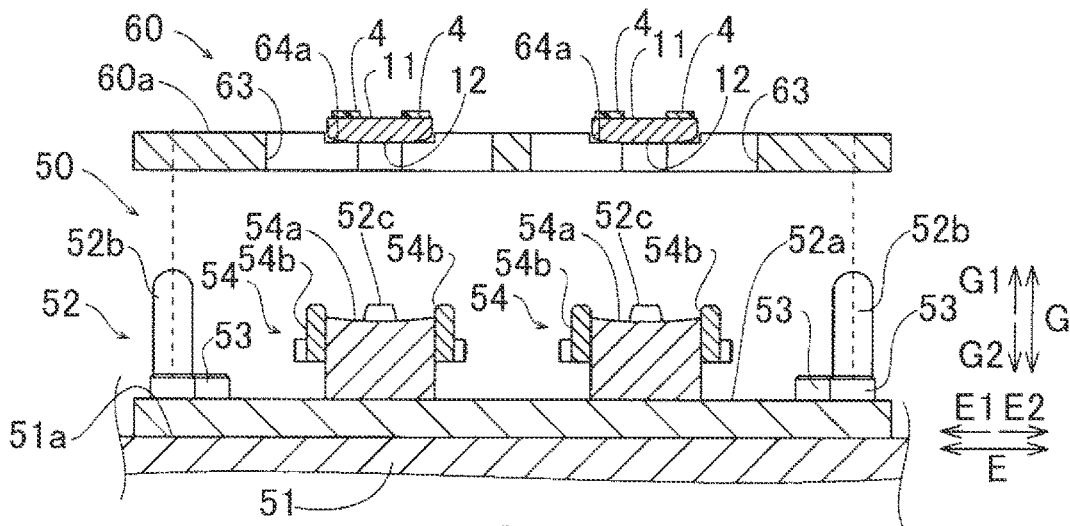
FIG. 9 is a sectional view illustrating a configuration before (FIG. 9A) and after (FIG. 9B) assembly of a magnet heating portion and a magnet placement jig according to the embodiment of the present disclosure.

(Configuration of Magnet Heating Portion) As illustrated in FIG. 9, the magnet heating portion 50 includes a heating plate 51 and a heating jig 52. The heating plate 51 (hot plate) is constituted as a heater that heats the heating jig 52 by raising the temperature of an upper surface 51a (a surface on the side in the direction of the arrow G1) using electric power r or the like. The heating jig 52 is fixed by fastening members 53 in the state of contacting the upper surface 51a of the heating plate 51, for example. The heating jig 52 is configured to be heated with heat transmitted from the heating plate 51 by contacting the heating plate 51.

Figure 10:
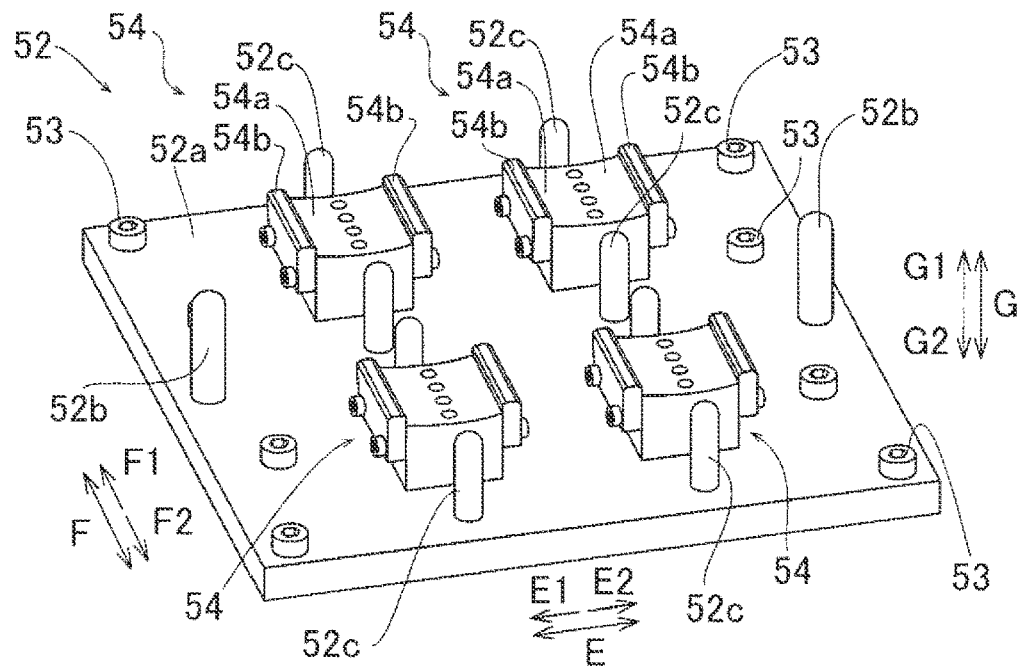
FIG. 10 is a perspective view illustrating the configuration of the magnet heating portion according to the embodiment of the present disclosure.

As illustrated in FIG. 10, the heating jig 52 includes a base portion 52a, positioning projecting portions 52b, guide projecting portions 52c, and projecting heating portions 54 (projecting heaters). The base portion 52a is formed in a flat plate shape, and fixed to the heating plate 51 by the fastening members 53 in the state of abutting against the upper surface 51a of the heating plate 51. A plurality of (e.g. four) projecting heating portions 54 are provided at predetermined intervals therebetween. The projecting heating portions 54 are formed so as to project from the base portion 52a toward the side in the direction of the arrow G1.

The positioning projecting portions 52b are provided at the center portion in the F direction so as to project toward the side in the direction of the arrow G1 in the vicinity of each of end portions of the base portion 52a on the side in the direction of an arrow E1 and the side in the direction of an arrow E2. The positioning projecting portions 52b are each formed in a circular column shape with a distal end portion formed in a hemispherical shape (tapered toward the distal end), for example. The magnet placement jig 60 is positioned with respect to the magnet heating portion 50 with the positioning projecting portions 52b fitted in a positioning hole portion 61 and a notched portion 62 (see FIG. 9B) of the magnet placement jig 60.

Figure 11:
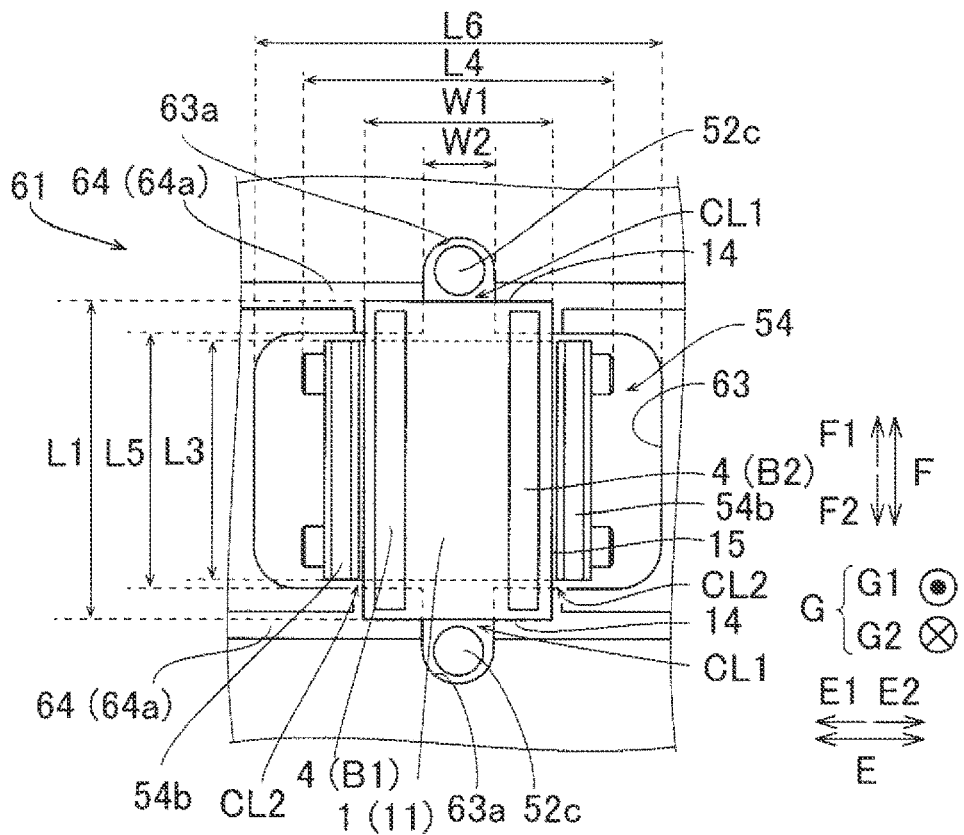
FIG. 11 is a partial enlarged view illustrating the configuration of the magnet heating portion and the magnet placement jig according to the embodiment of the present disclosure.

The guide projecting portions 52c are provided on the side in the direction of an arrow F1 and the side in the direction of an arrow F2 of each of the plurality of projecting heating portions 54. As illustrated in FIG. 11, the guide projecting portions 52c are positioned inside heating portion placement hole portions 63 of the magnet placement jig 60 when the magnet placement jig 60 is attached to the magnet heating portion 50. The guide projecting portions 52c each have a distal end portion formed in a hemispherical shape (tapered toward the distal end). Consequently, the guide projecting portions 52c are configured to guide the permanent magnets 1 to upper surfaces 54a (see FIG. 10) of the projecting heating portions 54 when the magnet placement jig 60 is attached to the magnet heating portion 50. The guide projecting portions 52c are disposed in the vicinity of the end surfaces 14 on both sides, in the F direction, of the permanent magnets 1 which are placed on the projecting heating portions 54 when the magnet placement jig 60 is attached to the magnet heating portion 50.

Figure 9B:
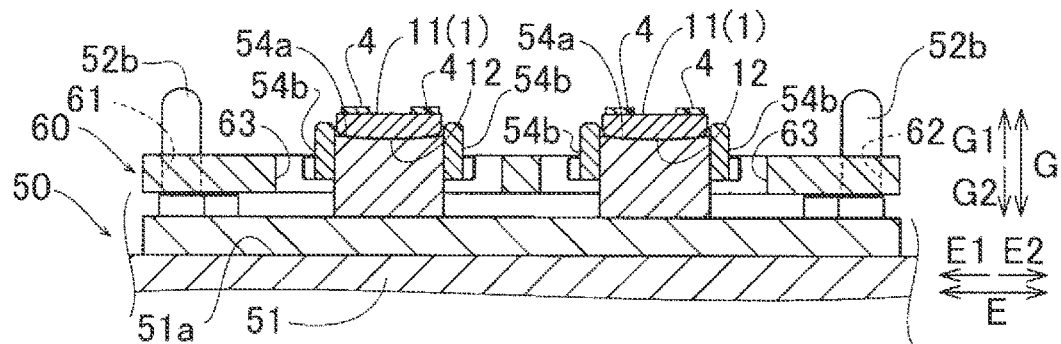

The projecting heating portions 54 each have a rectangular column shape, for example. The projecting heating portions 54 each have a length L3 in the F direction, and have a length L4 in the E direction. The length L3 is smaller than the length L1 of the permanent magnet 1 in the longitudinal direction. The length L4 is larger than the width W1 of the permanent magnet 1 in the lateral direction. As illustrated in FIG. 9B, the upper surfaces 54a of the projecting heating portions 54 are each shaped to be curved along the shape of the surface 12 of the permanent magnet 1. In addition, the upper surfaces 54a of the projecting heating portions 54 are each configured such that the permanent magnet 1 can be placed thereon with the surface 12 of the permanent magnet 1 serving as the lower surface and the surface 11 of the permanent magnet 1 serving as the upper surface. The projecting heating portions 54 are configured to directly heat the permanent magnets 1 by transmitting heat in the state of contacting the surfaces 12 of the permanent magnets 1.

As illustrated in FIG. 10, the projecting heating portions 54 each include guide plate portions 54b disposed on both sides, in the E direction, of the upper surface 54a and projecting toward the side in the direction of the arrow G1 with respect to the upper surface 54a. For example, the guide plate portions 54b are formed so as to extend along the F direction. In addition, the corner portions of end surfaces of the guide plate portions 54b on the side in the direction of the arrow G1 are chamfered. Consequently, the guide plate portions 54b are configured to guide the permanent magnets 1 to the upper surfaces 54a of the projecting heating portions 54 when the magnet placement jig 60 is attached to the magnet heating portion 50. The guide plate portions 54b are disposed in the vicinity of the lateral end surfaces 15 (see FIG. 11) of the permanent magnets 1 with the permanent magnets 1 placed on the projecting heating portions 54.

Consequently, as illustrated in FIG. 11, the guide plate portions 54b are disposed on both sides, in the E direction, of the permanent magnets 1 and the guide projecting portions 52c are disposed on both sides, in the F direction, of the permanent magnets 1 with the permanent magnets 1 placed on the projecting heating portions 54. This prevents the permanent magnets 1 from being displaced in the E direction or the F direction from the upper surfaces 54a and from slipping off from the upper surfaces 54a.

When heating the permanent magnet 1, as illustrated in FIG. 11, a clearance CL1 is provided between the guide projecting portions 52c and the end surfaces 14 of the permanent magnet 1. In addition, a clearance CL2 is provided between the guide plate portions 54b and the lateral end surfaces 15 of the permanent magnet 1. Consequently, transmission of heat between the permanent magnet 1 and the guide plate portions 54b and the guide projecting portions 52c is suppressed.

(Configuration of Magnet Placement Jig)

Figure 12:
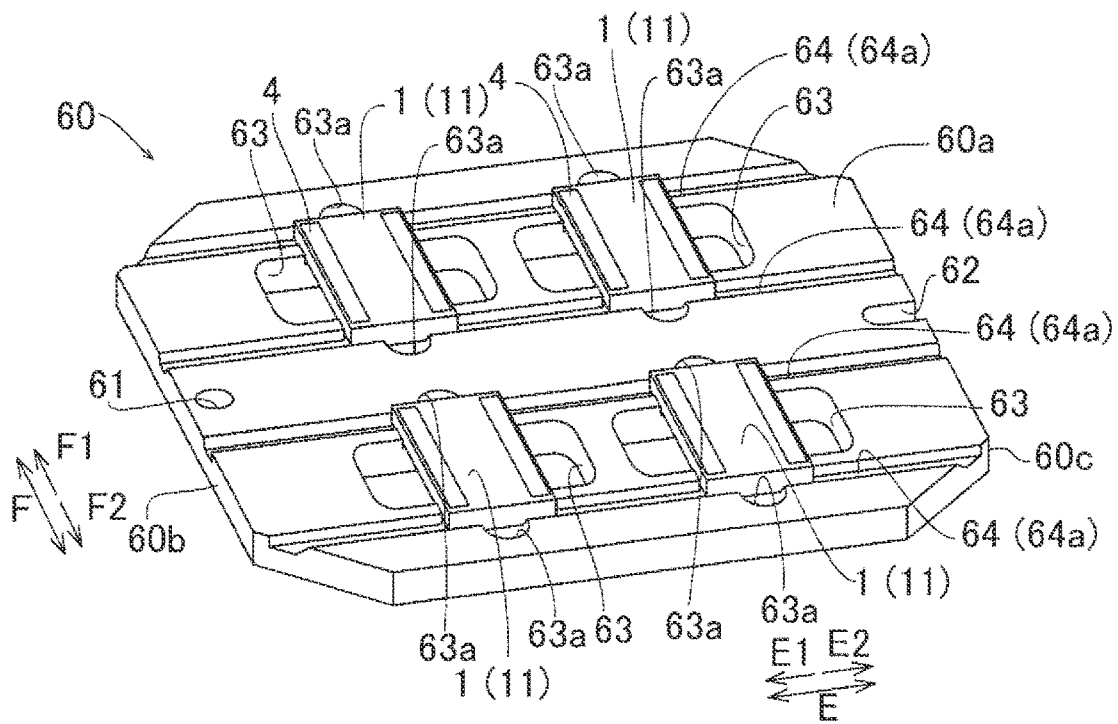
FIG. 12 is a perspective view illustrating the configuration of the magnet placement jig according to the embodiment of the present disclosure.

The magnet placement jig 60 is constituted from aluminum or an aluminum alloy, for example. As illustrated in FIG. 12, the magnet placement jig 60 is formed in a flat plate shape. The magnet placement jig 60 is provided with the positioning hole portion 61, the notched portion 62, a plurality of (e.g. four) heating portion placement hole portions 63, and a plurality of (e.g. four) groove portions 64. For example, the magnet placement jig 60 is constituted as a tray that conveys a plurality of permanent magnets 1 with the plurality of permanent magnets 1 placed thereon. In the present embodiment, a process of applying the adhesive 4 to the permanent magnets 1 and a process of drying the adhesive 4 are performed with the permanent magnets 1 placed on the magnet placement jig 60.

The positioning hole portion 61 has an opening in a circular shape as seen from the side in the direction of the arrow G1, As illustrated in FIG. 9B, the positioning hole portion 61 is constituted as a through hole to be penetrated by one of the two positioning projecting portions 52b of the magnet heating portion 50, In addition, the notched portion 62 is shaped by notching an end portion of the magnet placement jig 60 on the side in the direction of the arrow E2, and constituted such that the other of the two positioning projecting portions 52b can be disposed therein.

As illustrated in FIG. 11, the heating portion placement hole portion 63 is a generally rectangular hole portion that has a length L5, which is larger than the length L3 of the projecting heating portion 54, in the F direction, and that has a length L6, which is larger than the length L4 of the projecting heating portion 54, in the E direction. The length L5 is smaller than the length L1 of the permanent magnet 1 in the longitudinal direction. Consequently, the permanent magnet 1 is placed so as to extend off the heating portion placement hole portion 63 on both sides in the F direction. In this state, the permanent magnet 1 and the heating portion placement hole portion 63 overlap each other as seen from the side in the direction of the arrow G1. That is, the heating portion placement hole portion 63 is provided at a position at which the heating portion placement hole portion 63 overlaps the permanent magnet 1 as seen from the side on which the permanent magnet 1 is placed (side in the direction of the arrow G1).

In addition, the heating portion placement hole portion 63 is provided with notched portions 63a in which the guide projecting portions 52c are to be disposed and which are dented toward the side in the direction of the arrow F1 or the side in the direction of the arrow F2 from the heating portion placement hole portion 63. The notched portions 63a each have a width W2 in the E direction that is smaller than the width W1 of the permanent magnet 1 in the lateral direction.

As illustrated in FIG. 12, the groove portions 64 are provided in an upper surface 60a of the magnet placement jig 60 to extend along the E direction. Particularly, the groove portions 64 are formed so as to connect an end portion 60b, in the direction of the arrow E13, of the magnet placement jig 60 and the heating portion placement hole portion 63, an end portion 60c, in the direction of the arrow E2, of the magnet placement jig 60 and the heating portion placement hole portion 63, and between the heating portion placement hole portions 63. The permanent magnets 1 are placed on bottom portions 64a of the groove portions 64.

[Rotor Manufacturing Method According to Present Embodiment]

Next, a method of manufacturing the rotor 100 according to the present embodiment will be described with reference to FIGS. 1 to 7 and 9 to 18. FIG. 13 is a flowchart illustrating a method of manufacturing (process of manufacturing) the rotor 100 according to the present embodiment. FIG. 14 is a chart illustrating the state of the adhesive 4 during the process of manufacturing the rotor 100 (steps S1 to S7), in which the horizontal axis indicates the time and the vertical axis indicates the temperature of the adhesive 4 (vertical axis on the left side) and the thickness of the adhesive 4 (vertical axis on the right side). A temperature T5 is a normal temperature (room temperature), for example.

In step S1, the permanent magnets 1 and the adhesive 4 are prepared. In the present embodiment, as illustrated in FIG. 6, the adhesive 4 is prepared which contains the foaming agent 41 servings as an expansive agent to be expanded when heated to a temperature that is equal to or higher than the expansion temperature T1, the dilution solvent 44 which is volatile, and the main agent 42 and the curing agent 43 to be cured when heated to a temperature that is equal to or higher than the curing temperature T2 which is higher than the expansion temperature T1. At this time, in addition, the adhesive 4 in a molten state (in a flowable state) is prepared. For example, the adhesive 4 may be in a liquid state, or in a gel state. As illustrated in FIG. 15, the prepared adhesive 4 is accommodated in an application device 70. After that, the process proceeds to step S2. The prepared permanent magnets 1 are preferably not magnetized yet.

Figure 15A:
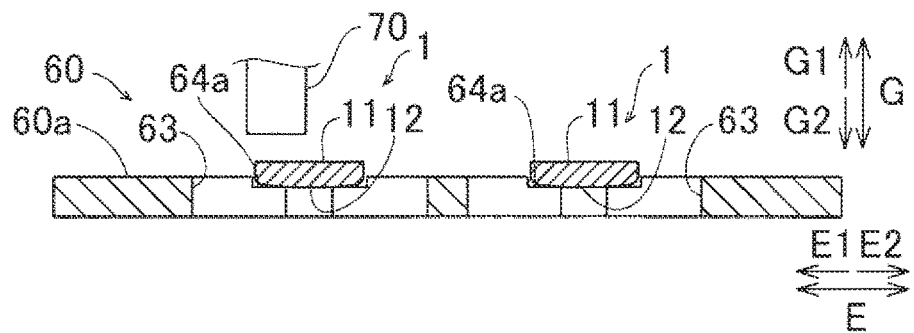
FIG. 15 illustrates a process of applying the adhesive to the permanent magnet according to the embodiment of the present disclosure before (FIG. 15A) and after (FIG. 15B) the application.

In step S2, as illustrated in FIG. 15A, the plurality of permanent magnets 1 are placed on the magnet placement jig 60. Particularly, the plurality of permanent magnets 1 are aligned and placed on the bottom portions 64a of the magnet placement jig 60 with the surfaces 12 serving as the lower surfaces and with the surfaces 11 serving as the upper surfaces in the vertical direction (G direction).

Figure 15B:
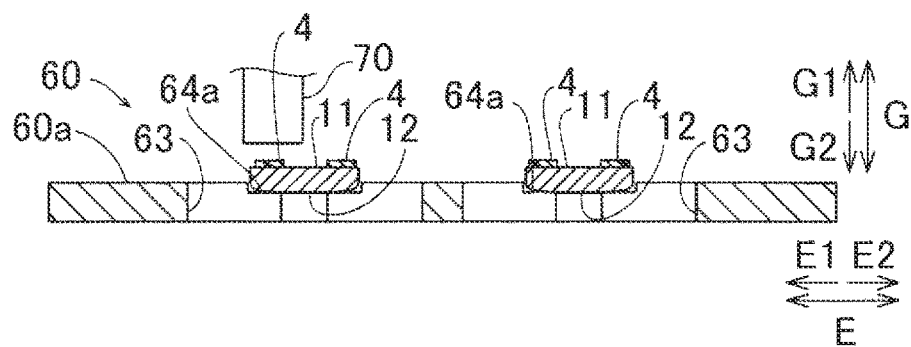

In step S3, as illustrated in FIG. 15B, the adhesive 4 is applied to the plurality of permanent magnets 1. In the present embodiment, the adhesive 4 is applied to the plurality of permanent magnets 1 with the plurality of permanent magnets 1 placed on the bottom portions 64a of the magnet placement jig 60. Particularly, the adhesive 4 is applied to (placed on) the permanent magnets 1 from above by moving the application device 70 and the magnet placement jig 60 relative to each other in the F direction while the adhesive 4 is discharged from an opening portion at the distal end of a nozzle of the application device 70.

For example, the adhesive 4 is applied along the F-axis direction to a portion (adhesive placement position B131) of the surface 11 of each of the permanent magnets 1 on the side in the direction of the arrow E1, and thereafter applied along the F-axis direction to a portion (adhesive placement position B2) of the surface 11 of each of the permanent magnets 1 on the side in the direction of the arrow E2. In addition, the adhesive 4 is formed on the surface 11 of each of the permanent magnets 1 by being applied so as to have the thickness t3 (see FIG. 8) and have a rectangular shape (see FIG. 3) as seen from the side in the direction of the arrow G1. At this time, the adhesive 4 is not applied to the end surfaces 14 and 15 of the permanent magnets 1 or the portions B3 and B4 in the vicinity of the end surfaces 14. After that, the process proceeds to step S4.

In step S4, the adhesive 4 is dried by heating the permanent magnets 1, In the present embodiment, the adhesive 4 is dried by volatilizing the dilution solvent 44 by the magnet heating portion 50 heating the permanent magnets 1. Particularly, as indicated in FIG. 14, the adhesive 4 is dried by the magnet heating portion 50 heating the permanent magnets 1 to the temperature T10 which is equal to or higher than the drying temperature T3 and which is lower than the curing temperature T2 and lower than the expansion temperature T1.

In addition, the viscosity of the adhesive 4 is improved when the adhesive 4 is dried and the dilution solvent 44, which is relatively less viscous, volatilized. When the viscosity of the adhesive 4 is improved, the adhesive 4 is positioned at the adhesive placement positions B1 and B2 to be fixed. As illustrated in FIG. 8, when the adhesive 4 is dried, the adhesive 4 is thinned since the thickness of the adhesive 4 is varied to the thickness t1 which is smaller than the thickness t3 of the adhesive 4 before the adhesive 4 is dried. In addition, as the adhesive 4 is thinned, the insertability (ease of insertion) of the permanent magnets 1 into the magnet hole portions 32 is accordingly improved.

In addition, in the present embodiment, as illustrated in FIG. 9, the adhesive 4 is dried by the projecting heating portions 54 directly heating the permanent magnets 1 with the permanent magnets 1 abutting against the upper surfaces 54a of the projecting heating portions 54 so that the permanent magnets 1 are located above and away from the bottom portions 64a (see FIG. 12) due to the projecting heating portions 54, as a consequence of moving one of the magnet placement jig 60 and the magnet heating portion 50 relative to the other such that the projecting heating portions 54 project upward from the heating portion placement hole portions 63.

For example, when the magnet placement jig 60 on which the plurality of permanent magnets 1 are placed are moved downward from a location above the heating jig 52 which is fixed to the heating plate 51 of the magnet heating portion 50, the projecting heating portions 54 and the guide plate portions 54b project upward from the heating portion placement hole portions 63, the positioning projecting portions 52b project upward from the positioning hole portion 61 and the notched portion 62, and the guide projecting portions 52c project upward from the notched portions 63a. At this time, the permanent magnets 1 are guided to the upper surfaces 54a of the projecting heating portions 54 by the guide plate portions 54b and the guide projecting portions 52c.

Figure 16:
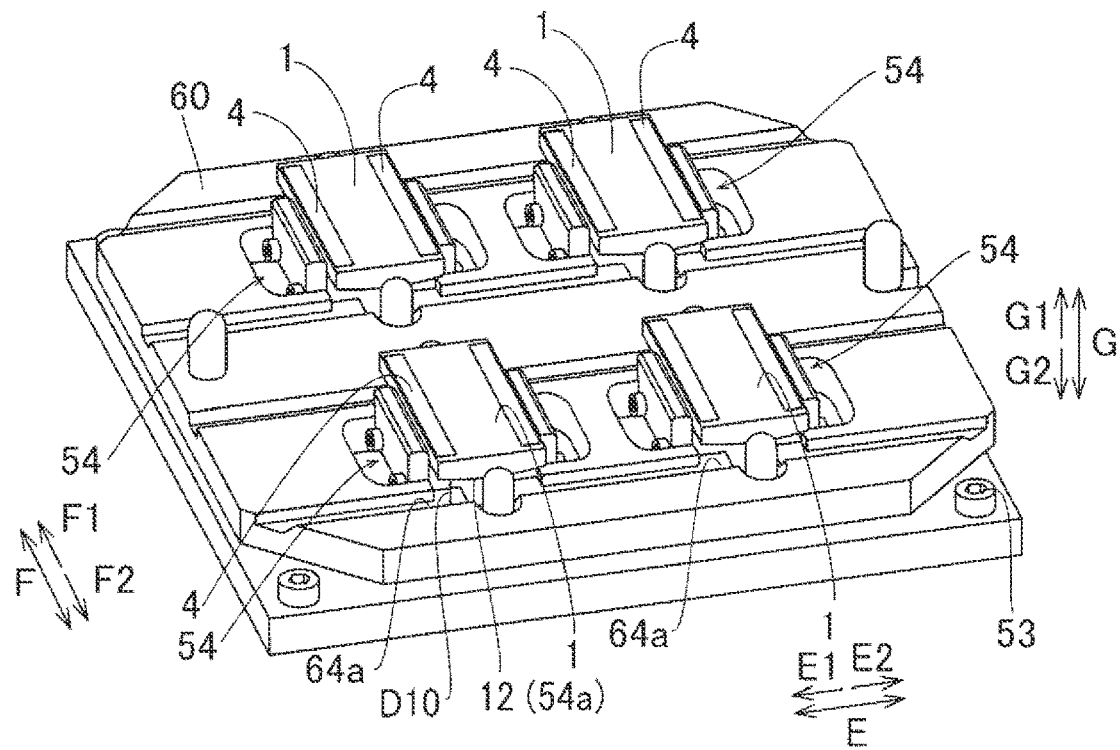
FIG. 16 illustrates a process of drying the adhesive by heating the permanent magnet according to the embodiment of the present disclosure.

Consequently, as illustrated in FIG. 16, the permanent magnets 1 are placed on the upper surfaces 54a of the projecting heating portions 54, and lifted to be disposed at a height above and away at a distance D10 from the bottom portions 64a. In this state, the permanent magnets 1 and the magnet placement jig 60 do not contact (make surface contact with) each other.

The permanent magnet 1 are then heated by raising the temperature of the heating plate 51 with the upper surfaces 54a of the projecting heating portions 54 of the magnet heating portion 50 contacting the surfaces 11 of the permanent magnets 1. For example, by heating the permanent magnets 1 to the temperature T10 (see FIG. 14) such that the permanent magnets 1 are at a temperature that is higher than the temperature 'I'5 of the adhesive 4, the adhesive 4 which is applied to the permanent magnets 1 is also heated generally to the temperature T10. Consequently, the dilution solvent 44 which is contained in the adhesive 4 is volatilized.

In the present embodiment, the adhesive 4 is dried by the magnet heating portion 50 directly heating the permanent magnet 1 such that the temperature of the boundary portion 4a (see FIG. 8A) of the adhesive 4 becomes higher than the temperature of the surface portion 4b (see FIG. 8A) of the adhesive 4. That is, when the permanent magnet 1 is heated, the temperature of the boundary portion 4a, which is a portion of the adhesive 4 that contacts the permanent magnet 1, is raised (generally to the temperature T10). At this time, the temperature of the surface portion 4b, which is a portion of the adhesive 4 that does not contact the permanent magnet 1, is lower than the temperature T10.

In the present embodiment, the adhesive 4 is dried by the magnet heating portion 50 directly heating the permanent magnet 1 such that the temperature of the surface portion 4b of the adhesive 4 becomes higher than the atmospheric temperature in the vicinity of the surface portion 4b of the adhesive 4. That is, when the permanent magnet 1 is heated, the temperature of the boundary portion 4a is raised generally to the temperature T10, and the temperature of the surface portion 4b is raised generally to the temperature T10. At this time, the atmospheric temperature in the vicinity of (around) the surface portion 4b is lower than the temperature of the surface portion 4b (generally the temperature T10). The atmospheric temperature in the vicinity of the surface portion 4b of the adhesive 4 is the temperature T5 in step S3, and is gradually raised from the temperature T5 as the temperature of the surface portion 4b of the adhesive 4 is raised in step S4, for example.

Figure 17:
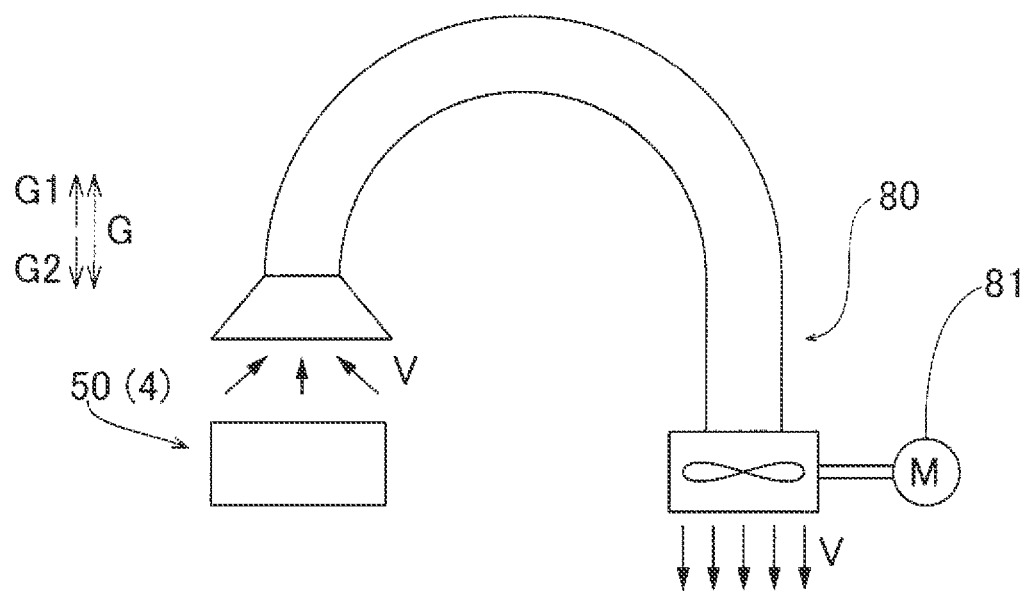
FIG. 17 is a schematic diagram illustrating the configuration of an exhaust device according to the embodiment of the present disclosure.

In the present embodiment, as illustrated in FIG. 17, the volatilized dilution solvent 44 (volatile gas V) is discharged by an exhaust device 80 disposed above the permanent magnets 1 during the process of drying the adhesive 4. That is, the concentration of the volatile gas is controlled by lowering the concentration of the volatile gas in the vicinity of the permanent magnets 1 by the exhaust device 80 discharging the volatile gas V from the vicinity of the permanent magnets 1 to the outside of facilities for manufacturing the rotor 100. In addition, the exhaust device 80 has an explosion-proof structure with no contact point for the motor 81 or the like disposed in the ventilation path.

In step S5, the rotor core 3 is prepared, Specifically, as illustrated in FIG. 4, the rotor core 3 is prepared in which the magnet hole portions 32 are provided with the groove portions 32*b* having the groove depth d1 which is larger than the thickness t1 of the dried adhesive 4. Particularly, a plurality of electromagnetic steel plates 31 are punched by a progressive pressing device (not illustrated). At this time, a plurality of electromagnetic steel plates 31 in a circular ring shape are formed in which the hole portions 132 (see FIG. 2) having the groove portions 32*b* are formed. As illustrated in FIG. 2, the plurality of electromagnetic steel plates 31 are then stacked on each other along the axial direction to form a plurality of (e.g. four) core blocks 30. The core blocks 30 are stacked on each other in the axial direction. Some of the plurality of core blocks 30 are rotated in the circumferential direction or inverted with respect to the other core blocks 30. Consequently, the rotor core 3 is formed, and the hole portions 132 of the plurality of core blocks 30 are connected so as to be continuous with each other in the axial direction, thereby forming the magnet hole portions 32. After that, the process proceeds to step S6.

Figure 18:
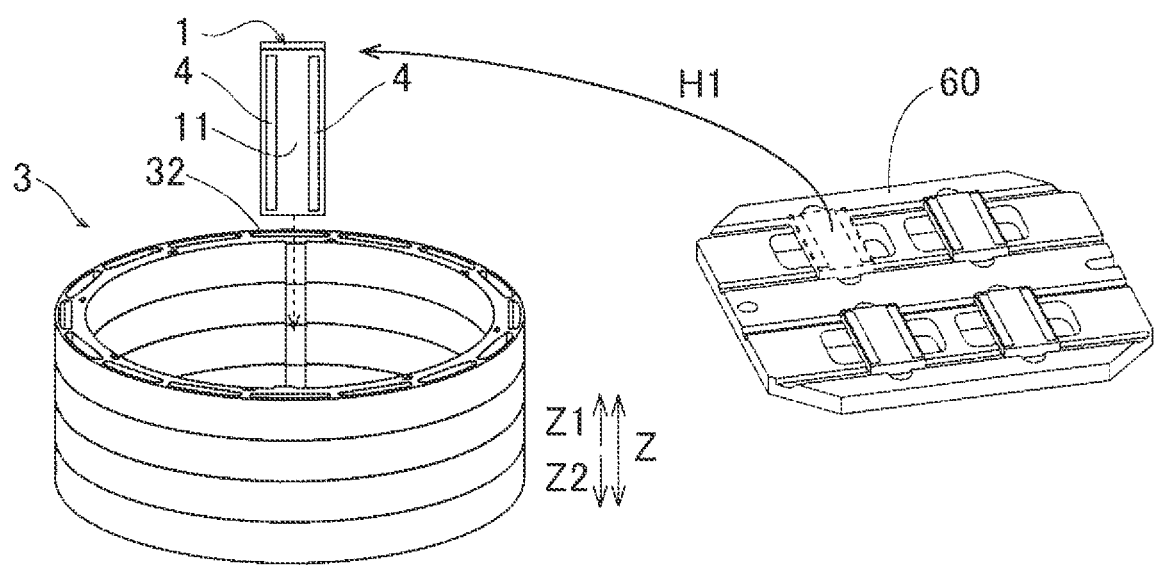
FIG. 18 illustrates a process of inserting the permanent magnet into the rotor core according to the embodiment of the present disclosure.
Figure 19:
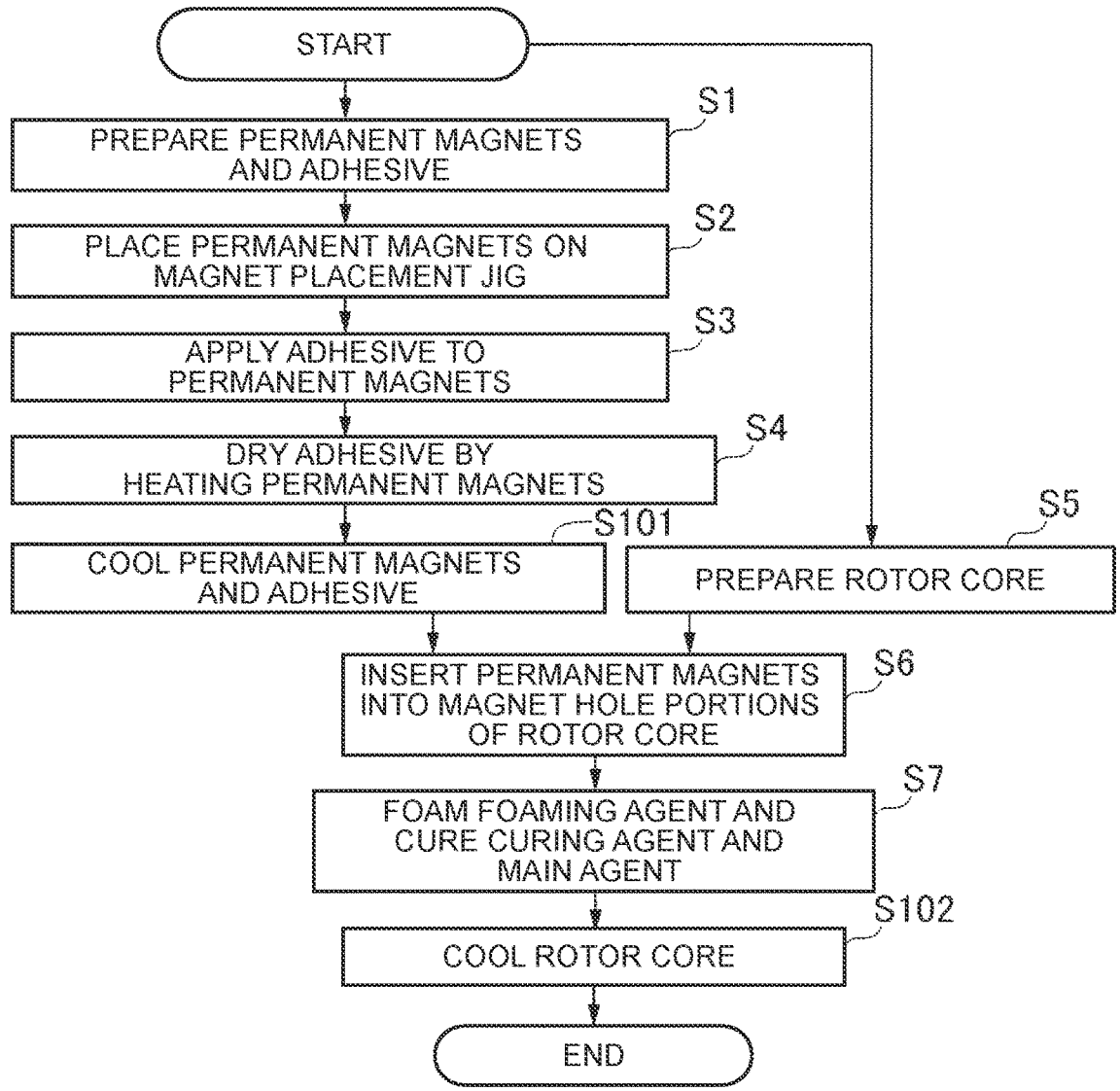
FIG. 19 is a flowchart illustrating a rotor manufacturing process according to a modification of the embodiment of the present disclosure.

In step S6, the permanent magnets 1 on which the dried adhesive 4 is disposed are inserted into the magnet hole portions 32 of the rotor core 3. Specifically, as illustrated in FIG. 18, the permanent magnets 1 to which the dried adhesive 4 is applied are placed again on the magnet placement jig 60 by moving one of the magnet placement jig 60 and the magnet heating portion 50 relative to the other. The permanent magnets 1 are then disposed on the rotor core 3 by moving the permanent magnets 1, which are placed on the magnet placement jig 60, from the magnet placement jig 60 to the rotor core 3.

Particularly, the permanent magnets 1 on which the dried adhesive 4 is disposed are disposed in the respective magnet hole portions 32 of the rotor core 3. Specifically, the permanent magnets 1 which are placed on the magnet placement jig 60 are moved from the magnet placement jig 60 to the vicinity of the rotor core 3 (see an arrow H1). The permanent magnets 1 are then inserted into the respective magnet hole portions 32 by moving the rotor core 3 and the permanent magnets 1 relative to each other in the axial direction, with the surfaces 11 on which the adhesive 4 is disposed directed toward the radially inner side. Although only one permanent magnet 1 is illustrated in FIG. 18, the permanent magnet 1 is inserted into each of the magnet hole portions 32. As illustrated in FIG. 7, in addition, the bottom portions 32*d* of the groove portions 32*b* of the magnet hole portion 32 and the adhesive 4 having the thickness t1 are disposed away from each other. After that, the process proceeds to step S7.

In step S7, as illustrated in FIG. 5, the permanent magnets 1 and the rotor core 3 are fixed (bonded) to each other by foaming the foaming agent 41 of the adhesive 4 and curing the main agent 42 and the curing agent 43 of the adhesive 4. Specifically, the rotor core 3 in which the permanent magnets 1 are disposed (and the permanent magnets 1) are heated such that the adhesive 4 is heated to a temperature T11 (see FIG. 14) that is higher than the expansion temperature T1 and that is equal to or higher than the curing temperature T2. Consequently, the thickness of the adhesive 4 is varied from the thickness t1 to the thickness t2 as the foaming agent 41 of the adhesive 4 is foamed and expanded.

In addition, as illustrated in FIG. 4, the thickness t2 of the adhesive 4 becomes generally equal to the distance from the surface 11 of the permanent magnet 1 to the bottom portion 32*d* of the groove portion 32*b*. That is, the adhesive 4 is expanded from the surface 11 of the permanent magnet 1 to the bottom portion 32*d* of the groove portion 32*b*. In addition, when the adhesive 4 is expanded, the surfaces 13 of the permanent magnet 1 are pressed toward the radially outer side, so that the wall surfaces 32*a* of the magnet hole portion 32 and the surfaces 13 of the permanent magnet 1 abut against each other. When the main agent 42 and the curing agent 43 of the adhesive 4 are cured, the permanent magnet 1 and the magnet hole portion 32 are fixed to each other by the adhesive 4 which has been cured.

After that, a process of magnetizing the permanent magnets 1, a process of joining a plurality of core blocks 30 to each other, etc. are performed. Consequently, the rotor 100 is completed as illustrated in FIG. 2. After that, as illustrated in FIG. 1, the rotor 100 is assembled to the stator 102 etc. to complete the rotary electric machine 101.

[Effects of Present Embodiment]

The following effects can be obtained with the present embodiment.

In the present embodiment, as described above, the permanent magnet (1) is directly heated by the magnet heating portion (50). Consequently, the boundary portion (4*a*) of the adhesive (4) with the permanent magnet (1) is directly heated by the permanent magnet (1), which prevents an increase in the drying time for the boundary portion (4*a*) of the adhesive (4) with the permanent magnet (1), unlike a case where the temperature of the permanent magnet (1) is lower than that of the adhesive (4) and heat is absorbed by the permanent magnet (1). As a result, an increase in the drying time for the boundary portion (4*a*) of the adhesive (4), the drying time for which tends to be relatively long, can be prevented, and accordingly the drying time for the entire adhesive (4) can be shortened easily. Thus, the adhesive (4) can be dried immediately in the case where the permanent magnet (1) is fixed to the rotor core (3) using the dried adhesive (4).

In addition, in the present embodiment, as described above, it is not necessary to perform heating in an enclosed space since the adhesive (4) is dried by volatilizing the volatile agent (44), unlike a case where the adhesive is dried via air. Consequently, the structure of a device that manufactures the rotor (100) can be prevented from being complicated in order to dry the adhesive (4) in the case where an explosion-proof heating furnace is not provided. In the case where a heating furnace is used, the heating efficiency is lowered, since heat is absorbed by a jig that aligns the permanent magnet or the like in addition to the adhesive (4) and the permanent magnet (1) to which the adhesive (4) is applied. In the case where the heating furnace is provided with an exhaust device, further, it is conceivable that heated air is discharged, which accordingly lowers the heating efficiency. In the case where a heating furnace is not provided, in contrast, the permanent magnet (1) (alone) is directly heated, and thus it is not necessary to heat the jig (60), air, etc., which improves the heating efficiency since the efficiency is not lowered even if air is discharged.

In addition, in the present embodiment, as described above, the step (S4) of drying the adhesive (4) is a step (S4) of drying the adhesive (4) by the magnet heating portion directly heating the permanent magnet (1) such that a temperature of a surface portion (4b) of the adhesive (4) becomes higher than an atmospheric temperature in the vicinity of the surface portion (4b) of the adhesive (4). In the case where the atmospheric temperature in the vicinity of the surface portion (4b) of the adhesive (4) is higher than the temperature of the surface portion (4b) of the adhesive (4), it is conceivable that the surface portion (4b) of the adhesive (4) is dried earlier than the other portions and a dried film is formed on the surface portion (4b) of the adhesive (4). In this case, it is conceivable that the dried film on the surface portion (4b) obstructs drying (volatilization) of the inside of the adhesive (4), which makes it difficult to dry the inside of the adhesive (4) and extends the drying time. In this respect, with the configuration according to the embodiment described above, in which the step (S4) of drying the adhesive (4) is performed in a state in which the temperature of the surface portion (4b) of the adhesive (4) is higher than the atmospheric temperature in the vicinity of the surface portion (4b) of the adhesive (4), it is possible to prevents formation of a dried film on the surface portion (4b) of the adhesive (4) before the inside of the adhesive (4) is dried as a consequence of heating of the surface portion (4b) of the adhesive (4) the atmosphere. As a result, since it is possible to prevent formation of a dried film before the inside of the adhesive (4) is dried, extension of the drying time due to the dried film can be prevented. The phrase "such that a temperature of a surface portion (4b) of the adhesive (4) becomes higher than an atmospheric temperature in the vicinity of the surface portion (4b) of the adhesive (4)" is used not only to mean that a state in which the temperature of the surface portion (4b) of the adhesive (4) is higher than the atmospheric temperature in the vicinity of the surface portion (4b) of the adhesive (4) is always maintained during the step (S4) of drying the adhesive (4), but also to mean that the temperature of the surface portion (4b) of the adhesive (4) is higher than the atmospheric temperature in the vicinity of the surface portion (4b) of the adhesive (4) for at least a part of the period during the step (S4) of drying the adhesive (4).

In addition, in the present embodiment, as described above, the step (S4) of drying the adhesive (4) is a step (S4) of drying the adhesive (4) by the magnet heating portion directly heating the permanent magnet (1) such that a temperature of a boundary portion (4a) of the adhesive (4) with the permanent magnet (1) becomes higher than a temperature of a surface portion (4b) of the adhesive (4). In the case where the temperature of the surface portion (4b) of the adhesive (4) is higher than the temperature of the boundary portion (4a) of the adhesive (4) with the permanent magnet (1), it is conceivable that the surface portion (4b) of the adhesive (4) is dried before the other portions and a dried film is formed on the surface portion (4b) of the adhesive (4). In this case, it is conceivable that the dried film on the surface portion (4b) obstructs drying (volatilization) of the inside of the adhesive (4), which makes it difficult to dry the inside of the adhesive (4) and extends the drying time. In this respect, with the configuration according to the embodiment described above, in which the step (S4) of drying the adhesive (4) is performed in a state in which the temperature of the boundary portion (4a) of the adhesive (4) with the permanent magnet (1) is higher than the temperature of the surface portion (4b) of the adhesive (4), it is possible to prevent formation of a dried film on the surface portion (4b) since the surface portion (4b) of the adhesive (4) is dried before the inside (boundary portion (4a)) of the adhesive (4) is dried. As a result, since it is possible to prevent formation of a dried film before the inside of the adhesive (4) is dried, extension of the drying time due to the dried film can be prevented. The phrase "such that a temperature of a boundary portion (4a) of the adhesive (4) with the permanent magnet (1) becomes higher than a temperature of a surface portion (4b) of the adhesive (4)" is used not only to mean that a state in which the temperature of the boundary portion (4a) of the adhesive (4) with the permanent magnet (1) is higher than the surface portion (4b) of the adhesive (4) is always maintained during the step (S4) of drying the adhesive (4), but also to mean that the temperature of the boundary portion (4a) of the adhesive (4) with the permanent magnet (1) is higher than the surface portion (4b) of the adhesive (4) for at least a part of the period during the step (S4) of drying the adhesive (4).

In addition, in the present embodiment, as described above, the adhesive (4) contains a thermosetting resin (42, 43) to be cured when heated to a temperature that is equal to or higher than a curing temperature (T2); the step of drying the adhesive (4) is a step of drying the adhesive (4) by heating the permanent magnet (1) to a temperature that is lower than the curing temperature (T2); and the step of fixing the permanent magnet (1) is a step of fixing the permanent magnet (1) to the rotor core (3) by curing the thermosetting resin (42, 43) by heating the adhesive (4) to a temperature that is equal to or higher than the curing temperature (T2). With such a configuration, the volatile agent (44) can be volatilized without curing the thermosetting resin (42, 43) in the step of drying the adhesive (4), and the permanent magnet (1) can be easily fixed (bonded) to the rotor core 3 by heating the adhesive (4) to a temperature that is equal to or higher than the curing temperature (T2).

In addition, in the present embodiment, as described above, the rotor core (3) has a magnet hole portion (32); the adhesive (4) contains an expansive agent (41) to be expanded when heated to a temperature that is equal to or higher than an expansion temperature (T1); the step of drying the adhesive (4) is a step of drying the adhesive (4) by heating the permanent magnet (1) to a temperature (1710) that is lower than the expansion temperature (T1) and that is lower than the curing temperature (T2); the step of placing the permanent magnet (1) is a step of inserting the permanent magnet (1) into the magnet hole portion (32); and the step of fixing the permanent magnet (1) is a step of fixing the permanent magnet (1) to the rotor core (3) by expanding the expansive agent (41) and curing the thermosetting resin (42, 43) by heating the adhesive (4) to a temperature (T1) that is equal to or higher than the expansion temperature (T1) and that is equal to or higher than the curing temperature (T2). With such a configuration, the permanent magnet 1 can be easily inserted into the magnet hole portion (32) since the thickness (t1) of the adhesive is relatively small before expansion of the expansive agent (41). After that, when the expansive agent (41) is expanded, the expanded expansive agent (41) can fill the clearance between the magnet hole portion (32) and the permanent magnet (1) (cause the magnet hole portion (32) and the permanent magnet (1) to tightly contact each other). Thus, when the thermosetting resin (42, 43) is cured in this state, the permanent magnet (1) can be easily fixed to the magnet hole portion (32). In addition, the adhesive (4) can be dried without expanding the expansive agent (41) or curing the thermosetting resin (42, 43), since the permanent magnet (1) is heated to a temperature (T10) that is lower than the expansion temperature (T1) and that is lower than the curing temperature (T2).

In addition, in the present embodiment, as described above, the step of drying the adhesive (4) is a step of drying the adhesive (4) by the magnet heating portion (50) directly heating a surface (12) of the permanent magnet (1) other than the adhesive placement position (B31, B2). With such a configuration, the magnet heating portion (50) can be prevented from contacting the adhesive (4), and thus the applied adhesive (4) can be prevented from being deformed during the step of drying the adhesive (4).

In addition, in the present embodiment, as described above, the step of drying the adhesive (4) is a step of drying the adhesive (4) by heating the permanent magnet (1) such that the magnet heating portion (50) contacts the surface (12) of the permanent magnet (1) other than the adhesive placement position (B1, B2). With such a configuration, the permanent magnet (1) can be heated easily by causing the magnet heating portion (50) to contact the permanent magnet (1).

In addition, in the present embodiment, as described above, the step of applying the adhesive (4) is a step of applying the adhesive (4) to the adhesive placement position (B1, B2) with the adhesive placement position (B1, B2) of the permanent magnet (1) serving as an upper surface (11) in a vertical direction; and the step of drying the adhesive (4) is a step of drying the adhesive (4) by heating the permanent magnet (1) such that the magnet heating portion (50) directly contacts a lower surface (12), in the vertical direction, of the permanent magnet (1). With such a configuration, the permanent magnet (1) is heated from the lower surface (12) on the opposite side from the upper surface (11) to which the adhesive 4 is applied, and thus contact between the adhesive 4 and the magnet heating portion (50) can be prevented more reliably.

In addition, in the present embodiment, as described above, the step of drying the adhesive (4) is a step of drying the adhesive (4) by directly heating a lower surface (12), in the vertical direction, of the permanent magnet (1) such that the magnet heating portion (50) contacts the lower surface (12), in the vertical direction, of the permanent magnet (1). With such a configuration, the lower surface (12) of the permanent magnet (1) can be heated easily by causing the magnet heating portion (50) to contact the lower surface (12) of the permanent magnet (1).

In addition, in the present embodiment, as described above, the step of drying the adhesive (4) is a step of drying the adhesive (4) by the magnet heating portion (50) heating the permanent magnet (1) with the permanent magnet (1) located away from a magnet placement jig (60) as a consequence of moving one of the magnet placement jig (60) and the magnet heating portion (50) relative to the other from a state in which the permanent magnet (1) is placed on the magnet placement jig (60). With such a configuration, the adhesive (4) is dried by heating the permanent magnet (1) with the permanent magnet (1) located away from the magnet placement jig (60), which suppresses heat release from the permanent magnet (1) to the magnet placement jig (60). As a result, the efficiency of heating for drying the adhesive (4) can be improved.

In addition, in the present embodiment, as described above, the magnet heating portion (50) includes a projecting heating portion (54) that projects upward; the magnet placement jig (60) is provided with a hole portion (63) that overlaps the permanent magnet (1) as seen from a side on which the permanent magnet (1) is placed; the step of applying the adhesive (4) is a step of applying the adhesive (4) to the permanent magnet (1) with the permanent magnet (1) placed on a bottom portion (64*a*) of the magnet placement jig (60); and the step of drying the adhesive (4) is a step of drying the adhesive (4) by the projecting heating portion (54) heating the permanent magnet (1) with the permanent magnet (1) abutting against the projecting heating portion (54) so that the permanent magnet (1) is located above and away from the bottom portion (64*a*) due to the projecting heating portion (54), as a consequence of moving one of the magnet placement jig (60) and the magnet heating portion (50) relative to the other such that the projecting heating portion (54) projects upward from the hole portion (63). With such a configuration, the permanent magnet (1) can be located away from the magnet placement jig (60), and the permanent magnet (1) can be heated easily with the permanent magnet (1) placed on the projecting heating portion (54), by just causing the projecting heating portion (54) to project from the hole portion (63).

In addition, in the present embodiment, as described above, the step of placing the permanent magnet (1) is a step of placing the permanent magnet (1) on the rotor core (3) by placing the permanent magnet (1), to which the dried adhesive (4) has been applied, on the magnet placement jig (60) and moving the permanent magnet (1), which has been placed on the magnet placement jig (60), from the magnet placement jig (60) to the rotor core (3) as a consequence of moving one of the magnet placement jig (60) and the magnet heating portion (50) relative to the other after the step of drying the adhesive (4). With such a configuration, the permanent magnet (1) can be placed on the rotor core (3) easily using the magnet placement jig (60) which is used in the step of drying the adhesive (4).

In addition, in the present embodiment, as described above, the step of drying the adhesive (4) is a step of drying the adhesive (4) by volatilizing the volatile agent (44) by the magnet heating portion (50) heating the permanent magnet (1) to a temperature (T10) such that a temperature of the permanent magnet (1) becomes higher than a temperature (T5) of the adhesive (4) while an exhaust device disposed above the permanent magnet (1) is discharging the volatile agent (44) which has been volatilized. With such a configuration, the gas concentration of the volatile agent (44) (volatile gas (V)) which is volatilized around the permanent magnet (1) can be prevented from becoming excessively high. In the case where a heating furnace is provided with the exhaust device, air which has been heated in order to heat the adhesive is discharged, which lowers the heating efficiency. With the present embodiment, on the other hand, the adhesive (4) is dried by heating the permanent magnet (1), and thus the heating efficiency can be prevented from being lowered compared to the case where air which has been heated in order to heat the adhesive is discharged.

[Modifications]

The embodiment disclosed herein should be considered as exemplary and non-limiting in all respects.

For example, in the embodiment described above, the rotor 100 is constituted as a so-called inner rotor which is disposed on the radially inner side of the stator 102. However, the present disclosure is not limited thereto. That is, the rotor 100 may be constituted as an outer rotor.

In the embodiment described above, in addition, the permanent magnets 1 are directly heated with the projecting heating portions 54 contacting the permanent magnets 1. However, the present disclosure is not limited thereto. For example, the permanent magnets 1 may be directly heated by induction heating (IH), a high-energy beam (laser), or a local hot air applied to the permanent magnets 1 with the permanent magnets 1 located away from the magnet heating portion 50.

In the embodiment described above, in addition, the process of manufacturing the rotor 100 is indicated in the flowchart illustrated in FIG. 14. However, the present disclosure is not limited thereto. For example, as in the flowchart illustrated in FIG. 18, a step (step S101) of cooling the permanent magnets 1 and the adhesive 4 to normal temperature may be provided after step S4, and a step (step S102) of cooling the rotor core 3 to normal temperature may be provided after step S5. If such steps are provided, a worker is enabled to convey and work on the permanent magnets 1 and the rotor core 3 which have been cooled while grasping the permanent magnets 1 and the rotor core 3, for example.

Figure 20:
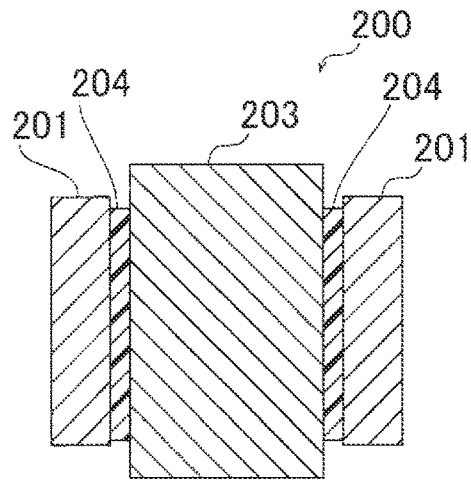
FIG. 20 schematically illustrates the configuration of a rotor according to a modification of the embodiment of the present disclosure.

In the embodiment described above, in addition, the adhesive 4 contains the foaming agent 41. However, the present disclosure is not limited thereto. For example, to constitute a part of a surface permanent magnet (SPM) motor such as a rotor 200 according to a modification illustrated in FIG. 20, the rotor 200 can be manufactured by drying an adhesive 204 that does not contain the foaming agent 41 by heating permanent magnets 201 and thereafter pasting the permanent magnets 201 to surfaces of a rotor core 203.

In the embodiment described above, in addition, the adhesive 4 is applied to the permanent magnets 1 (see FIG. 15). However, the present disclosure is not limited thereto. For example, the adhesive 4 may be applied to the permanent magnets 1 by a different method such as stamping.

In the embodiment described above, in addition, the adhesive 4 is applied to (placed at) only the adhesive placement positions B1 and B2 on the surface 11 of the permanent magnets 1. However, the present disclosure is not limited thereto. That is, the adhesive 4 may be applied by setting adhesive placement positions other than the adhesive placement positions B1 and B2 on the surface 11 of the permanent magnets 1 and applying the adhesive 4 to (placing the adhesive at) the set adhesive placement positions.

In the embodiment described above, in addition, the atmospheric temperature in the vicinity of the surface portion 4b of the adhesive 4 is gradually raised from the temperature T5 (temperature that is generally equal to that of the adhesive 4 before being heated) in step S4. However, the present disclosure is not limited thereto. For example, step S4 may be performed in a heating furnace at an atmospheric temperature that is higher than the temperature T5. That is, after the adhesive 4 is applied to the permanent magnets 1 in step S3, the permanent magnets 1 to which the adhesive 4 has been applied are carried into the heating furnace. After that, by performing step S4 in the heating furnace at an atmospheric temperature that is higher than the temperature T5, the temperature of the surface portion 4b of the adhesive 4 may be varied so as to be higher than the atmospheric temperature by the magnet heating portion 50 heating the permanent magnets 1 and the adhesive 4 from a state in which the temperature (T5) of the surface portion 4b of the adhesive 4 is lower than the atmospheric temperature (temperature in the heating furnace which is higher than T5), In addition, by performing step S4 in the heating furnace at an atmospheric temperature that is higher than the temperature T5, the temperature of the boundary portion 4a may be varied so as to be higher than the temperature of the surface portion 4b by the magnet heating portion 50 heating the permanent magnets 1 and the adhesive 4 from a state in which the temperature of the surface portion 4b of the adhesive 4 is higher than the temperature (T5) of the boundary portion 4a of the adhesive 4 with the permanent magnet 1 because of heat from the atmosphere.

The invention claimed is:

1. A method of manufacturing a rotor that includes a rotor core and a permanent magnet fixed to the rotor core using an adhesive, the method comprising:
    applying the adhesive, which contains a volatile agent, to an adhesive placement position of the permanent magnet;
    drying the adhesive by volatilizing the volatile agent by a magnet heater directly heating the permanent magnet such that a temperature of the permanent magnet becomes higher than a temperature of the adhesive after applying the adhesive;
    placing the permanent magnet on the rotor core after drying the adhesive; and
    fixing the permanent magnet to the rotor core by curing the adhesive after placing the permanent magnet.

2. The method according to claim 1, wherein
    the adhesive is dried by the magnet heater by directly heating the permanent magnet such that a temperature of a surface of the adhesive becomes higher than an atmospheric temperature in a vicinity of the surface of the adhesive.

3. The method according to claim 2, wherein
    the adhesive is dried by the magnet heater by directly heating the permanent magnet such that a temperature of a boundary of the adhesive with the permanent magnet becomes higher than a temperature of a surface of the adhesive.

4. The method according to claim 3, wherein:
    the adhesive contains a thermosetting resin to be cured when heated to a temperature that is equal to or higher than a curing temperature;
    the adhesive is dried by directly heating the permanent magnet to a temperature that is lower than the curing temperature; and
    the permanent magnet is fixed to the rotor core by curing the thermosetting resin by heating the adhesive to a temperature that is equal to or higher than the curing temperature.

5. The method according to claim 4, wherein:
    the rotor core has a magnet hole;
    the adhesive contains an expansive agent to be expanded when heated to a temperature that is equal to or higher than an expansion temperature;
    the adhesive is dried by directly heating the permanent magnet to a temperature that is lower than the expansion temperature and that is lower than the curing temperature;
    the permanent magnet is placed on the rotor core by inserting the permanent magnet into the magnet hole; and
    the permanent magnet is fixed to the rotor core by expanding the expansive agent and curing the thermosetting resin by heating the adhesive to a temperature that is equal to or higher than the expansion temperature and that is equal to or higher than the curing temperature.

6. The method according to claim 2, wherein:
    the adhesive contains a thermosetting resin to be cured when heated to a temperature that is equal to or higher than a curing temperature;
    the adhesive is dried by directly heating the permanent magnet to a temperature that is lower than the curing temperature; and
    the permanent magnet is fixed to the rotor core by curing the thermosetting resin by heating the adhesive to a temperature that is equal to or higher than the curing temperature.

7. The method according to claim 6, wherein:
the rotor core has a magnet hole;
the adhesive contains an expansive agent to be expanded when heated to a temperature that is equal to or higher than an expansion temperature;
the adhesive is dried by directly heating the permanent magnet to a temperature that is lower than the expansion temperature and that is lower than the curing temperature;
the permanent magnet is placed on the rotor core by inserting the permanent magnet into the magnet hole; and
the permanent magnet is fixed to the rotor core by expanding the expansive agent and curing the thermosetting resin by heating the adhesive to a temperature that is equal to or higher than the expansion temperature and that is equal to or higher than the curing temperature.

8. The method according to claim 1, wherein
the adhesive is dried by the magnet heater by directly heating the permanent magnet such that a temperature of a boundary of the adhesive with the permanent magnet becomes higher than a temperature of a surface of the adhesive.

9. The method according to claim 8, wherein:
the adhesive contains a thermosetting resin to be cured when heated to a temperature that is equal to or higher than a curing temperature;
the adhesive is dried by directly heating the permanent magnet to a temperature that is lower than the curing temperature; and
the permanent magnet is fixed to the rotor core by curing the thermosetting resin by heating the adhesive to a temperature that is equal to or higher than the curing temperature.

10. The method according to claim 9, wherein:
the rotor core has a magnet hole;
the adhesive contains an expansive agent to be expanded when heated to a temperature that is equal to or higher than an expansion temperature;
the adhesive is dried by directly heating the permanent magnet to a temperature that is lower than the expansion temperature and that is lower than the curing temperature;
the permanent magnet is placed on the rotor core by inserting the permanent magnet into the magnet hole; and
the permanent magnet is fixed to the rotor core by expanding the expansive agent and curing the thermosetting resin by heating the adhesive to a temperature that is equal to or higher than the expansion temperature and that is equal to or higher than the curing temperature.

11. The method according to claim 1, wherein:
the adhesive contains a thermosetting resin to be cured when heated to a temperature that is equal to or higher than a curing temperature;
the adhesive is dried by directly heating the permanent magnet to a temperature that is lower than the curing temperature; and
the permanent magnet is fixed to the rotor core by curing the thermosetting resin by heating the adhesive to a temperature that is equal to or higher than the curing temperature.

12. The method according to claim 11, wherein:
the rotor core has a magnet hole;
the adhesive contains an expansive agent to be expanded when heated to a temperature that is equal to or higher than an expansion temperature;
the adhesive is dried by directly heating the permanent magnet to a temperature that is lower than the expansion temperature and that is lower than the curing temperature;
the permanent magnet is placed on the rotor core by inserting the permanent magnet into the magnet hole; and
the permanent magnet is fixed to the rotor core by expanding the expansive agent and curing the thermosetting resin by heating the adhesive to a temperature that is equal to or higher than the expansion temperature and that is equal to or higher than the curing temperature.

13. The method according to claim 1, wherein
the adhesive is dried by the magnet heater directly heating a surface of the permanent magnet other than the adhesive placement position.

14. The method according to claim 13, wherein
the adhesive is dried by directly heating the permanent magnet such that the magnet heater contacts the surface of the permanent magnet other than the adhesive placement position.

15. The method according to claim 13, wherein:
the adhesive is applied to the adhesive placement position with the adhesive placement position of the permanent magnet serving as an upper surface in a vertical direction; and
the adhesive is dried by the magnet heater directly heating a lower surface, in the vertical direction, of the permanent magnet.

16. The method according to claim 15, wherein
the adhesive is dried by directly heating the lower surface, in the vertical direction, of the permanent magnet such that the magnet heater contacts the lower surface, in the vertical direction, of the permanent magnet.

17. The method according to claim 1, wherein
the adhesive is dried by the magnet heater directly heating the permanent magnet with the permanent magnet located away from a magnet placement jig as a consequence of moving one of the magnet placement jig and the magnet heater relative to the other from a state in which the permanent magnet is placed on the magnet placement jig.

18. The method according to claim 17, wherein:
the magnet heater includes a projecting heater that projects upward;
the magnet placement jig is provided with a hole that overlaps the permanent magnet as seen from a side on which the permanent magnet is placed on the magnet placement jig;
the adhesive is applied to the permanent magnet with the permanent magnet placed on a bottom of the magnet placement jig; and
the adhesive is dried by the projecting heater directly heating the permanent magnet with the permanent magnet abutting against the projecting heater so that the permanent magnet is located above and away from the bottom due to the projecting heater, as a consequence of moving one of the magnet placement jig and the magnet heater relative to the other such that the projecting heater projects upward from the hole.

19. The method according to claim 17, wherein
the permanent magnet is placed on the rotor core by placing the permanent magnet, to which the dried adhesive has been applied, on the magnet placement jig as a consequence of moving one of the magnet placement jig and the magnet heater relative to the other after drying the adhesive and moving the permanent magnet, which has been placed on the magnet placement jig, from the magnet placement jig to the rotor core.

20. The method according to claim 1, wherein
the adhesive is dried by volatilizing the volatile agent by the magnet heater directly heating the permanent magnet such that a temperature of the permanent magnet becomes higher than a temperature of the adhesive while an exhaust disposed above the permanent magnet is discharging the volatile agent which has been volatilized.

* * * * *